US012397274B2

(12) United States Patent
Meacham et al.

(10) Patent No.: US 12,397,274 B2
(45) Date of Patent: Aug. 26, 2025

(54) SYSTEMS AND METHODS FOR MITIGATING PARTICLE AGGREGATION CAUSED BY STANDING WAVE AND TRANSIENT ACOUSTOPHORETIC EFFECTS

(71) Applicant: OpenCell Technologies, Inc., Saint Louis, MO (US)

(72) Inventors: John Mark Meacham, St. Louis, MO (US); Andrei G. Fedorov, Atlanta, GA (US); Fahrettin Levent Degertekin, Atlanta, GA (US)

(73) Assignee: OpenCell Technologies, Inc., St. Louis, MO (US)

( * ) Notice: Subject to any disclaimer, the term of this patent is extended or adjusted under 35 U.S.C. 154(b) by 1013 days.

(21) Appl. No.: 17/416,923

(22) PCT Filed: Dec. 20, 2019

(86) PCT No.: PCT/US2019/067895
§ 371 (c)(1),
(2) Date: Jun. 21, 2021

(87) PCT Pub. No.: WO2020/132470
PCT Pub. Date: Jun. 25, 2020

(65) Prior Publication Data

US 2022/0072578 A1 Mar. 10, 2022

Related U.S. Application Data

(60) Provisional application No. 62/783,771, filed on Dec. 21, 2018.

(51) Int. Cl.
*B01F 31/00* (2022.01)
*B01F 31/80* (2022.01)
(Continued)

(52) U.S. Cl.
CPC .............. *B01F 31/80* (2022.01); *B05B 17/06* (2013.01); *B06B 1/0292* (2013.01); *B06B 1/06* (2013.01)

(58) Field of Classification Search
CPC ....... B05B 17/06; B01F 31/80; B06B 1/0292; B06B 1/06
See application file for complete search history.

(56) References Cited

U.S. PATENT DOCUMENTS 4,659,014 A * 4/1987 Soth ...................... B05B 17/063 310/317
2006/0223185 A1 10/2006 Federov et al.
(Continued)

FOREIGN PATENT DOCUMENTS

WO 2006009854 A2 1/2006

OTHER PUBLICATIONS

International Search Report and Written Opinion for PCT/US2019/067895 mailed on Apr. 30, 2020.

*Primary Examiner* — Anshu Bhatia
(74) *Attorney, Agent, or Firm* — Thomas | Horstemeyer, LLP

(57) ABSTRACT

In some embodiments according to the present disclosure, methods for mitigating particle retention are provided including the use of frequency sweep excitation to eject particle in the sweep. In some embodiments according to the present disclosure, the acoustically driven fluid ejector can be capable of being switched between multiple modes of operation. In other embodiments according to the present disclosure, the acoustically driven fluid ejector can be altered such that it includes the capability to be filled with a biocompatible material to aid in the mitigation of particle aggregation in the acoustically driven fluid ejector. In some embodiments according to the present disclosure, the solid structure and number of nozzles of the acoustically driven
(Continued)

fluid ejector can be adjusted such that the ejector of the acoustically driven fluid ejector can be self-pumping, i.e. no external pumping mechanism other than acoustics driven flow drag is used.

14 Claims, 13 Drawing Sheets

(51) Int. Cl.

| | |
|---|---|
| *B05B 17/06* | (2006.01) |
| *B06B 1/02* | (2006.01) |
| *B06B 1/06* | (2006.01) |

(56) References Cited

U.S. PATENT DOCUMENTS

| | | | |
|---|---|---|---|
| 2009/0052272 | A1 | 2/2009 | Sarvazyan et al. |
| 2011/0240752 | A1 | 10/2011 | Meachum et al. |
| 2017/0343465 | A1 | 11/2017 | Schoendube et al. |

* cited by examiner

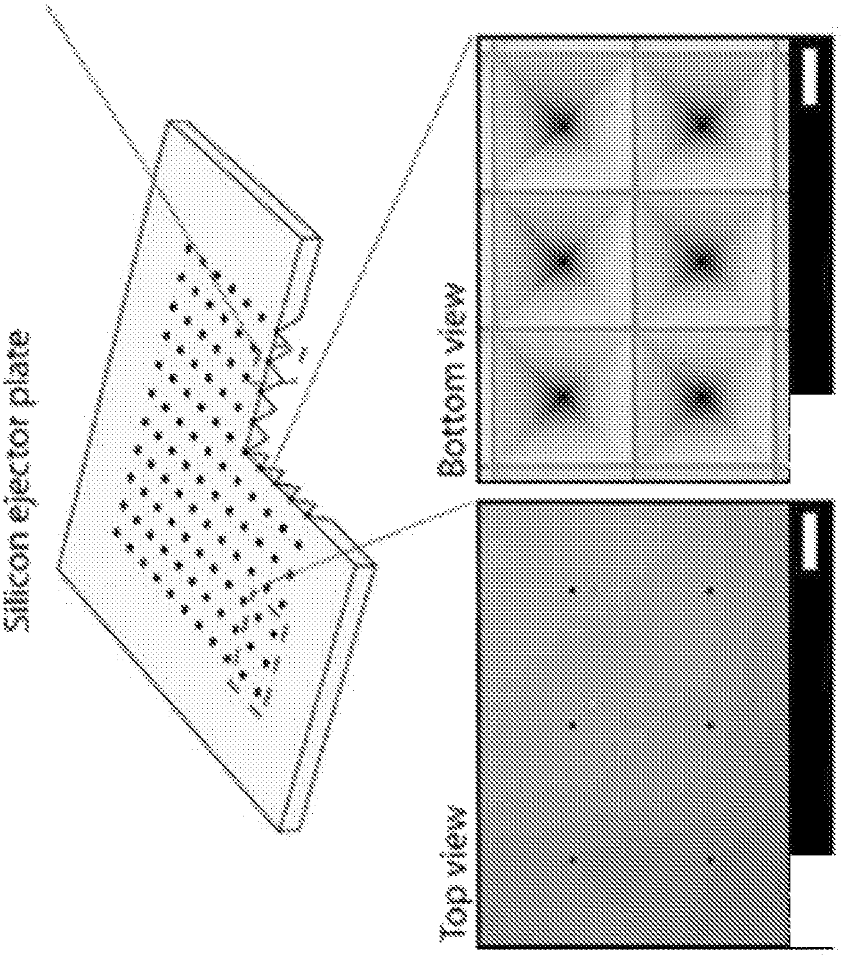
FIG. 2G
FIG. 2F
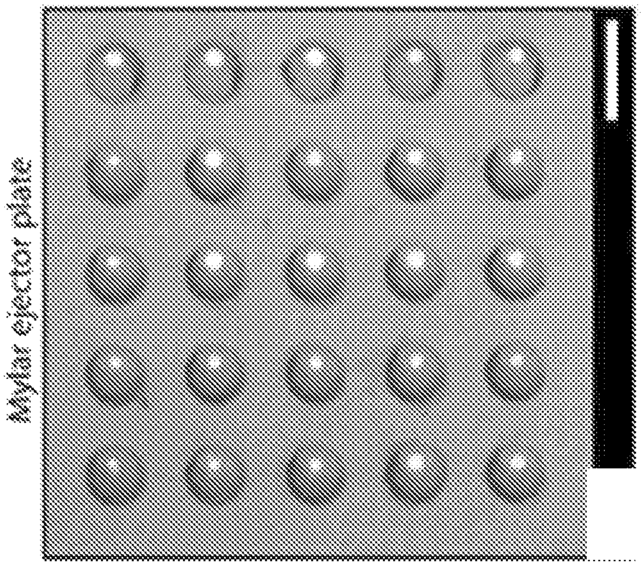
FIG. 2E

SYSTEMS AND METHODS FOR MITIGATING PARTICLE AGGREGATION CAUSED BY STANDING WAVE AND TRANSIENT ACOUSTOPHORETIC EFFECTS

CROSS REFERENCE TO RELATED APPLICATIONS

This application is the 35 U.S.C. § 371 national stage application of PCT Application No. PCT/US2019/067895, filed Dec. 20, 2019, which claims priority to U.S. Provisional Application entitled "SYSTEMS AND METHODS FOR MITIGATING PARTICLE AGGREGATION CAUSED BY STANDING WAVE AND TRANSIENT ACOUSTOPHORETIC EFFECTS," having Ser. No. 62/783,771, filed on Dec. 21, 2018, both of which are entirely incorporated herein by reference as if fully set forth herein.

BACKGROUND

Acoustic wave driven fluid ejectors (also referred to herein as acoustically driven fluid ejectors) are a class of ejectors where droplets are separated from a larger body of fluid by the forces generated by pressure waves. Some of these ejectors would utilize acoustic radiation pressure to separate droplets or generate jets from a surface of a fluid reservoir and do not need any orifice or nozzles [Ref1], Some others use locally actuated vibrating plates with orifices where the pressure drop due to free fluid surface around the orifice forces the droplets or jets out of a reservoir [Ref 2]. Yet in some other acoustic wave driven ejectors an acoustic wave actuator in connection with a fluid reservoir can generate acoustic fields in the reservoir which can be focused by some tapered nozzle structure with an orifice at its end. This reservoir can act like an acoustic cavity with multiple outlets so that a single actuator can generate droplets or jets from multiple orifices in parallel. An example of this type of ejector is described in several references [Ref 3, 4, 5].

During the operation of these acoustic ejectors, especially the ones which utilize substantially closed cavities as reservoirs and solid nozzles, or vibrating plates, acoustic waves can form standing wave patterns (pressure maxima and minima) in the fluid reservoir volume. At certain frequencies, called modal frequencies, these standing wave amplitudes can be especially high. For example in Ref. 4, with a reservoir height of about 0.5 mm, and nozzle plate thickness of 0.5 mm and filled with a water like fluid, these frequencies can be about 950 kHz, 1.46 MHz; 940 kHz, 1.44 MHz; 960 kHz, 1.47 MHz. For reservoir height of 1 mm, these frequencies can be about 700 kHz and 1.2 MHz; 600 kHz and 1.1 MHz; 800 kHz and 1.3 MHz. The overall height of the fluid medium from the rigid boundary to the orifice is a determinant of the modal frequencies. Excitation of these cavity modes is usually advantageous because it allows to generate high pressure levels for ejection with low input electrical energy to the actuators, improving the efficiency of the ejectors [Ref.3, 4].

In some applications the fluids that are ejected by these ejectors contain particles such as biological cells which would have different mechanical properties than the fluid. As a result, these particles can be collected and aggregated in pressure maxima and minima due to the acoustophoretic forces generated by the pressure field in the fluid reservoir. The collection at the maxima and minima depends on the particle-specific acoustophoretic contrast factor. Many biological cells, for example, are collected at the pressure minima of standing acoustic fields. This is a well-known phenomenon in the field of acoustofluidics. For example, FIGS. 1A-1B show that in a nozzle-based ejector structure, the particles (polystyrene beads, properties similar to biological cells) collect at the pressure nodes and away from the pressure peaks in a direction depending on the slope based on the Gorkov potential (Ref. 6, 7). In this ejector structure, orifices at the tips of the nozzles are open, creating another pressure node as in FIG. 1C, so that particles to the right of the negative pressure peak are pushed to the nozzle tip by acoustophoretic and flow induced forces (red arrows show the forces on particles). Therefore, whether the particles will stay in the reservoir or they will be ejected depends on the net force on them exerted by the fluid drag due to flow and acoustophoretic forces. For example, if a cell is located to the right of the last pressure peak in FIG. 1C (i.e. between the orifice at the tip of the triangular nozzle and the pressure peak), acoustophoretic forces will push the cell to the right, in the direction of the orifice. In locations to the left of the pressure peak close to the nozzle the acoustophoretic forces will force the cells to the other pressure node. The flow drag will also move the fluid and the particles to the orifice during ejection, so some of the cells in these regions can still be ejected if the flow drag forces overcome the acoustophoretic forces. Note that these arguments are made on a 2-dimensional model and simulations, but they are generally valid in nozzles in 3 dimensions as well. An example of an ejector device with a 2D pyramidal nozzle array fabricated in a silicon wafer as well as mylar substrate is shown in FIG. 2E (Ref.5).

This particle aggregation is undesired in many applications as this can prevent majority of the particles not being ejected from the reservoir while the fluid is ejected or it can result in device failure due to clogging. In applications such as mechanoporation of cells using acoustic ejector structures as described in Ref. 5, this can cause low overall recovery of treated cells. Accordingly, there is a need to address the aforementioned deficiencies and inadequacies.

SUMMARY

Described herein are methods of mitigating particle aggregation. Methods as described herein can comprise administering to a sample in need thereof a standing acoustic field comprising a frequency sweep excitation to eject particles during the sweep while not allowing a clear standing aggregation to develop. The sample in need thereof can be in a cavity or a reservoir of an acoustically driven fluid ejection device as described herein.

The frequency sweep excitation has a range from about 200 kHz to about 2000 kHz, about 200 kHz to about 3000 kHz, about 200 kHz to about 4000 kHz, about 200 kHz to about 5000 kHz, about 200 kHz to about 6000 kHz, about 200 kHz to about 7000 kHz, about 200 kHz to about 8000 kHz, about 300 kHz to about 1900 kHz, about 400 kHz to about 1800 kHz, about 500 kHz to about 1700 kHz, about 600 kHz to about 1600 kHz, about 700 kHz to about 1500 kHz, about 800 kHz to about 1400 kHz, about 900 kHz to about 1300 kHz, about 1000 kHz to about 1200 kHz, or about 1000 kHz.

The frequency sweep excitation is delivered rapidly within 1 ms.

Also described herein are methods of mitigating particle aggregation, comprising: administering to a sample in need thereof a standing acoustic field having a frequency of operation capable of being switched between multiple modes of operation. The sample in need thereof can be in a cavity or a reservoir of an acoustically driven fluid ejection device as described herein.

The multiple modes of operation can comprise a first mode and a second mode, and are capable of moving the nodal points whereas, the amplitude is such that ejection of particles happens as a result of the first mode (i.e. an ejection mode) and the second mode keeps particles in the sample in need thereof moving (i.e. a moving or mixing mode).

Described herein are methods of mitigating particle aggregation in an acoustically driven fluid ejector comprising: adjusting the number of nozzles of an ejector of the acoustically driven fluid ejector such that the ejector is configured to be self-pumping and no external pumping mechanism other than acoustics driven flow drag is used to transport the fluid from the ejector.

The adjusting can comprise increasing the number of nozzles or orifices or orifices/nozzle per lateral area such that the ejector is self-pumping, and the flow rate of fluid from the reservoir through the ejecting nozzles is high enough so that the flow drag forces overcome the acoustophoretic forces to prevent particle aggregation in a large section of the overall fluid volume containing the bulk or majority of cells filling the reservoir of the ejector. A solid structure may not be used inside the ejector cavity.

The number of nozzles or orifices or orifices/nozzle per lateral area can be increased such that the ejector is self-pumping, and the flow rate is high enough so that the flow drag forces overcome the acoustophoretic forces to prevent particle aggregation in a large section of the overall fluid volume in the ejector an acoustically transparent solid structure may be used inside the ejector cavity so that cells are only in the fluid region that the flow drag forces are larger than the acoustophoretic forces causing particle aggregation.

In certain aspects, the cavity of embodiments of acoustically driven fluid ejectors according to systems and methods as described herein can be filled with a biocompatible material that has the same or similar acoustic properties to the buffer solution.

In certain aspects, embodiments of acoustically driven fluid ejectors as described herein can be customized to be filled with a biocompatible material that has the same or similar acoustic properties to the buffer solution and where this material impedes the aggregation of particles in certain locations of the device.

In certain aspects, the acoustically driven fluid ejector as described herein further comprises one or more electrodes within the reservoir of the acoustically driven fluid ejector and in the vicinity of the ejector orifices or in the nozzles, the electrodes configured to provide an electric field to a sample in the reservoir.

In other embodiments of the present disclosure, the number of nozzles or orifices or orifices/nozzle per lateral area of the acoustically driven fluid ejector can be increased such that the ejector of the acoustically driven fluid ejector can be self-pumping, and the flow rate is high enough so that the flow drag forces overcome the acoustophoretic forces to prevent particle aggregation in a large section of the overall fluid volume in the ejector of the acoustically driven fluid ejector. In certain implementations of this embodiment a solid structure may not be used inside the ejector cavity of the acoustically driven fluid ejector. In some embodiments according to the present disclosure, the number of nozzles or orifices or orifices/nozzle per lateral area can be increased such that the ejector of the acoustically driven fluid ejector can be self-pumping, and the flow rate can be high enough so that the flow drag forces overcome the acoustophoretic forces to prevent particle aggregation in a large section of the overall fluid volume in the ejector of the acoustically driven fluid ejector. In certain implementations of this embodiment an acoustically transparent solid structure may be used inside the ejector cavity of the acoustically driven fluid ejector so that cells are only in the fluid region that the flow drag forces are larger than the acoustophoretic forces causing particle aggregation.

In embodiments, described herein are methods of mitigating particle aggregation in an wave-driven fluid ejector. In an embodiment, a method of mitigating particle aggregation in an acoustic wave-driven fluid ejector, comprises administering to a sample in need thereof, the sample in need thereof comprising particles, a standing acoustic field comprising a frequency sweep excitation to eject particles during the sweep while not allowing a clear standing aggregation to develop. The frequency sweep excitation can have a range from about 200 kHz to about 2000 kHz about 200 kHz to about 2000 kHz, about 200 kHz to about 3000 kHz, about 200 kHz to about 4000 kHz, about 200 kHz to about 5000 kHz, about 200 kHz to about 6000 kHz, about 200 kHz to about 7000 kHz, about 200 kHz to about 8000 kHz, about 300 kHz to about 1900 kHz, about 400 kHz to about 1800 kHz, about 500 kHz to about 1700 kHz, about 600 kHz to about 1600 kHz, about 700 kHz to about 1500 kHz, about 800 kHz to about 1400 kHz, about 900 kHz to about 1300 kHz, about 1000 kHz to about 1200 kHz, or about 1000 kHz. The frequency sweep excitation can be delivered rapidly within 1 ms.

In another embodiment of methods as described herein, described herein is a method of mitigating particle aggregation in an acoustic wave-driven fluid ejector, comprising administering to a sample in need thereof a standing acoustic field having a frequency of operation capable of being switched between multiple modes of operation. The multiple modes of operation can comprise a first mode and a second mode, and are capable of moving the nodal points whereas, the amplitude is such that ejection of particles happens as a result of the first mode and the second mode keeps particles in the sample in need thereof moving.

In another embodiment, described herein is a method of mitigating particle aggregation in an acoustically driven fluid ejector comprising adjusting the number of nozzles of an ejector of the acoustically driven fluid ejector in the range of from 0.5 to 50 nozzles per square millimeter (1 to 40 nozzles per square millimeter, 5 to 30 nozzles per square millimeter, 10 to 20 nozzles per square millimeter) to adjust the flow rate. In embodiments of methods as described herein, the adjusting comprises adjusting the number orifices per nozzle in the 1 orifice/nozzle up to 14 orifices per nozzle (or about 2 orifice/nozzle up to 13 orifices per nozzle, 3 orifice/nozzle up to 12 orifices per nozzle, 4 orifice/nozzle up to 11 orifices per nozzle, 5 orifice/nozzle up to 10 orifices per nozzle, 6 orifice/nozzle up to 9 orifices per nozzle, 7 orifice/nozzle up to 8 orifices per nozzle) so that the flow rate of fluid from the reservoir through the ejecting nozzles is high enough so that the flow drag forces overcome the acoustophoretic forces to prevent particle aggregation in a large section of the overall fluid volume containing the bulk or majority of cells filling the reservoir of the ejector. In embodiments of methods as described herein, a solid structure is not be used inside the ejector cavity of devices utilized by methods as described herein. In embodiments, the number of nozzles or orifices or orifices/nozzle per lateral area can be increased such that the ejector is self-pumping, and the flow rate is high enough so that the flow drag forces overcome the acoustophoretic forces to prevent particle aggregation in a large section of the overall fluid volume in the ejector an acoustically transparent solid structure may be used inside the ejector cavity so that cells are only in the fluid region that the flow drag forces are larger than the acoustophoretic forces causing particle aggregation. In an embodiment, a reservoir of the acoustically driven fluid ejector comprises a biocompatible material that has the same or similar acoustic properties to the buffer solution. In embodiments, an acoustically driven fluid ejector comprises a biocompatible material that has the same or similar acoustic properties to the buffer solution and where this material impedes the aggregation of particles in certain locations of the device. In embodiments, the biocompatible material has a surface distanced from the nozzle tip closer than the first pressure node from the nozzle tip. In embodiments, the biocompatible material has a surface distanced from the nozzle tip closer than the first pressure peak from the nozzle tip. In embodiments, the acoustically driven fluid ejector further comprises one or more electrodes within the reservoir of the acoustically driven fluid ejector and in the vicinity of the ejector orifices or in the nozzles, the electrodes configured to provide an electric field to a sample in the reservoir.

Described herein are acoustic wave-driven fluid ejectors. In an embodiment, an acoustic wave-driven fluid ejector comprises an acoustic actuator; a plurality of ejector structures formed by an ejector plate on a side of the acoustic wave-driven fluid ejector opposite the acoustic actuator; a biocompatible structure positioned in between the ejector structures and the acoustic actuator; and a sample reservoir formed by the ejector plate and a side of the biocompatible structure opposite the acoustic actuator. The sample reservoir can comprise a suspension of cells in a buffer. The buffer can be water, cell culture media, an electroporation buffer, a pH buffer, or combinations thereof. In embodiments, the ejector plate can be about 10 microns to about 1 millimeter thick. In embodiments, the ejector plate can have a substantially higher acoustic impedance than a fluid sample in the fluid reservoir. In embodiments, the ejector plate can be single crystal silicon oriented in the (100), (010), or (001) direction, aluminum, copper, brass, plastics, silicon oxide, silicon nitride, or combinations thereof. In embodiments, the ejector plate can comprise aluminum. In embodiments, the biocompatible structure can be mylar, polydimethylsiloxane, silicone rubber, polyester, Teflon, or other suitable polymer material. In embodiments, the biocompatible structure is planar. In embodiments, the biocompatible structure has a geometry substantially complementary to the ejector structures on a surface opposite the acoustic actuator. In embodiments, the biocompatible structure can be about 1 micrometer to about 100 millimeters thick (or about 10 to about 90 millimeters thick, about 20 to about 80 millimeters thick, about 30 to about 70 millimeters thick, about 40 to about 60 millimeters thick, or about 50 millimeters thick). In embodiments, the biocompatible structure abuts the actuator. In embodiments, the biocompatible structure does not abut the actuator, and there is a fluid reservoir in between the actuator and biocompatible structure. In embodiments, the biocompatible structure is a biocompatible film about 1 micrometer to about 100 micrometers thick (or about 10 to about 90 micrometers thick, about 20 to about 80 micrometers thick, about 30 to about 70 micrometers thick, about 40 to about 60 micrometers thick, or about 50 micrometers thick). In embodiments, the fluid ejector can further a fluid reservoir abutted on one side by the acoustic actuator and a surface of the biocompatible film opposite the ejector structures on the opposite side. In embodiments, the fluid reservoir can comprise water, methanol, a dielectric liquid, dielectric carbon fluid, an organic solvent, cell culture media, an electroporation buffer, a pH buffer, or combinations thereof. In embodiments, each of the plurality of ejector structures can have an orifice about 50 nanometers to about 5 millimeters in diameter (or about 100 nanometers, about 200 nanometers, about 300 nanometers, about 400 nanometers, about 500 nanometers, about 600 nanometers, about 700 nanometers, about 800 nanometers, about 900 nanometers, about 100 micrometers, about 200 micrometers, about 300 micrometers, about 400 micrometers, about 500 micrometers, about 600 micrometers, about 700 micrometers, about 800 micrometers, about 900 micrometers about 1 millimeter, about 2 millimeters, about 3 millimeters, or about 4 millimeters). In embodiments, each of the plurality of ejector structures has an orifice about 50 nanometers to about 200 micrometers in diameter (or about 100 nanometers, about 200 nanometers, about 300 nanometers, about 400 nanometers, about 500 nanometers, about 600 nanometers, about 700 nanometers, about 800 nanometers, about 900 nanometers, about 100 micrometers). In embodiments, the number of ejector structures or ejector structures per lateral area can be increased such that the ejector is self-pumping. In embodiments, the number of ejector structures or ejector structures per lateral area can be increased such that fluid motion through the fluid ejector is driven by acoustics-driven flow drag and no external pump. In embodiments, the acoustic actuator can be configured to administer to a sample in need thereof in the sample reservoir a standing acoustic field comprising a frequency sweep excitation to eject sample from the reservoir from the ejector structures during the sweep while not allowing a clear standing aggregation to develop in the ejector structures. In embodiments, the frequency sweep excitation can have a range from about 200 kHz to about 2000 kHz, about 200 kHz to about 2000 kHz, about 200 kHz to about 3000 kHz, about 200 kHz to about 4000 kHz, about 200 kHz to about 5000 kHz, about 200 kHz to about 6000 kHz, about 200 kHz to about 7000 kHz, about 200 kHz to about 8000 kHz, about 300 kHz to about 1900 kHz, about 400 kHz to about 1800 kHz, about 500 kHz to about 1700 kHz, about 600 kHz to about 1600 kHz, about 700 kHz to about 1500 kHz, about 800 kHz to about 1400 kHz, about 900 kHz to about 1300 kHz, about 1000 kHz to about 1200 kHz, or about 1000 kHz. In embodiments, the frequency sweep excitation can be delivered rapidly within 1 ms. In embodiments, the acoustic actuator is configured to administer to a sample in need thereof in the sample reservoir a standing acoustic field having a frequency of operation capable of being switched between multiple modes of operation. In embodiments, the multiple modes of operation comprise a first mode and a second mode, and are capable of moving the nodal points whereas, the amplitude is such that ejection of particles happens as a result of the first mode and the second mode keeps particles in the sample in need thereof moving. In embodiments, the acoustic actuator is partially or fully immersed in fluid for cooling.

In embodiments, acoustic wave-driven fluid ejectors can comprise an electrode, a pair of electrodes, or an array of electrodes. In embodiments, electrode, a pair of electrodes, or an array of electrodes can be present in the fluid reservoir. In embodiments, the electrode, a pair of electrodes, or an array of electrodes can be present in the ejector structures.

BRIEF DESCRIPTION OF THE DRAWINGS

Many aspects of the disclosed devices and methods can be better understood with reference to the following drawings.

The components in the drawings are not necessarily to scale, emphasis instead being placed upon clearly illustrating the relevant principles. Moreover, in the drawings, like reference numerals designate corresponding parts throughout the several views.

FIG. 1B shows simulated pressure variation within the ejector cavity of an embodiment of an acoustically driven fluid ejector for an existing ejector at one of the resonant mode frequencies. As a scale for dimension, the nozzle plate with triangular nozzle is 0.5 mm thick.

FIGS. 2E-2G represent the three-dimensional (3D) nature of an embodiment of ejector nozzle plates of an acoustically driven ejector structure as described herein formed in mylar and silicon wafer. The scale bar is 1 mm.

FIG. 4A illustrates the typical configuration of an embodiment of an acoustically driven fluid ejector where an acoustic actuator at the bottom of the fluid reservoir generates standing waves in the reservoir and ejects droplets or jets, which can include particles or biological cells. The solid arrows show the acoustophoretic forces on the cells where the dashed arrows show the drag forces due to ejection induced flow in the reservoir. FIG. 4B shows acoustic pressure distribution along the vertical direction in the fluid with a pressure node at the orifice. The arrows indicate the acoustophoretic forces. This is a typical pressure distribution during ejection from an embodiment of an acoustically driven fluid ejector. A significant number of cells can aggregate in the reservoir away from the nozzles.

FIG. 5A illustrates a prior art ejector in use. FIG. 5B shows pressure distribution in such prior art and multi-orifice nozzle shown in FIG. 5C. FIG. 5C illustrates multiple orifices can be introduced to the ejector with overall similar nozzle plate and reservoir thickness to prior art. Multiple orifices can increase the flow rate and hence drag forces so that motion of more particles are dominated by drag and move to the orifice rather than aggregate due to acoustophoretic forces. Overall pressure distributions is not changed significantly.

FIG. 6B shows an embodiment of an acoustically driven fluid ejector structure with acoustically transparent layer (which can be biocompatible material) compared to a prior art structure FIG. 6A. Because the solid layer has similar acoustic properties as the buffer solution (fluid) the standing wave pattern can be preserved and ejection is achieved, but particles (cells) cannot aggregate around the pressure minima in the solid region FIG. 6C. If the solid layer covers all the volume except for the region between the last pressure peak and orifice, the particles can be driven to the orifice by both the acoustophoretic forces and fluid drag. Even if that is not the case, less cells will be retained in the ejector as proportionally larger number are introduced in the desired locations filled with fluid.

FIG. 7B shows an embodiment of an acoustically driven fluid ejector structure with acoustically transparent layer compared to a prior art structure depicted in FIG. 7A. The nozzle plate of FIG. 7B can be thinner to allow better fluid flow and at the same time the number of orifices per area is increased, while maintaining a suitable pressure distribution as shown in FIG. 7C.

FIG. 8A shows an embodiment of an acoustically driven fluid ejector structure with acoustically transparent layer operated at a lower frequency. The height of the reservoir can be increased to have a lower frequency mode. The frequency can be 200-500 kHz range as compared to 700 kHz-2 MHz range. The standing wave pattern is preserved and ejection is achieved, but particles (cells) cannot aggregate around the pressure minima in the solid region. If the solid layer thickness is between the last pressure peak and orifice, the particles will be driven to the orifice by both the acoustophoretic forces and fluid drag. Even if that is not the case, less cells will be retained in the ejector as proportionally larger number are introduced in the desired locations filled with fluid (FIG. 8B).

FIG. 9A is an embodiment of an acoustically driven fluid ejector structure with acoustically transparent solid layer. The solid layer can be shaped to match the nozzle structure so that a uniform flow resistance is achieved in the fluid region. As shown in FIG. 9B, suitable pressure distribution can be maintained.

DETAILED DESCRIPTION

Figures 1A, 1B, 1C:
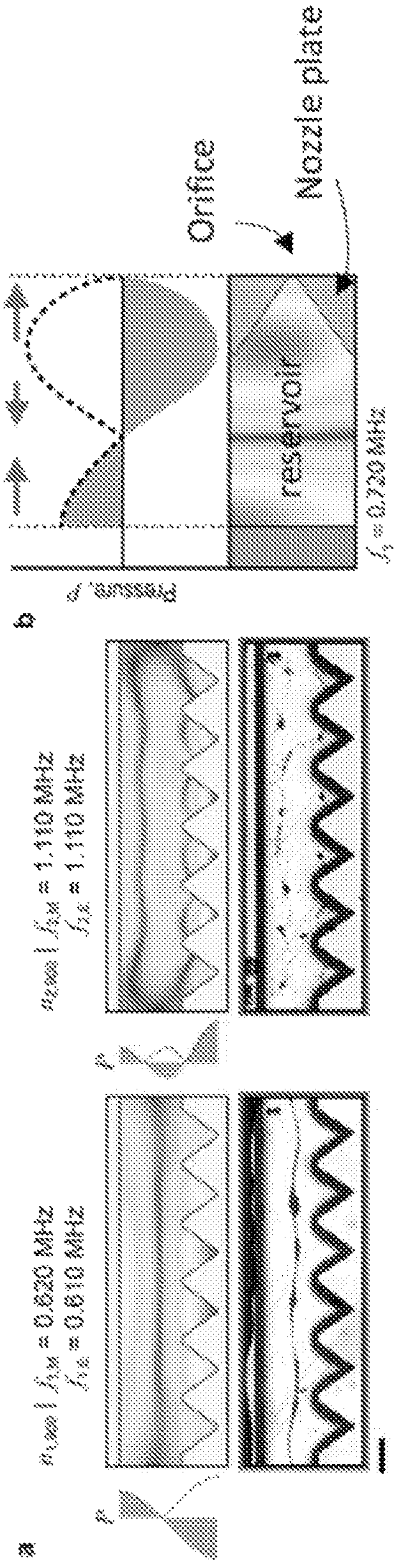
FIGS. 1A-1B show visualized particle distributions (bottom) and corresponding simulated pressure distributions (top) at the first two cavity resonances (FIG. 1A and FIG. 1B) of an embodiment of an acoustic ejector structure (also referred to herein as acoustically driven ejector structure or acoustic ejector structure or acoustically driven fluid ejector).

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of mechanical engineering, fluid motion, acoustophoretics (use of acoustic waves to move particles or cells), and cellular biology.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Definitions

Unless otherwise defined, all technical and scientific terms used herein have the same meaning as commonly understood by one of ordinary skill in the art. Although methods and materials similar or equivalent to those described herein can be used in the practice or testing of the present disclosure, suitable methods and materials are described herein.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Unless otherwise indicated, all numbers expressing quantities of ingredients, properties such as reaction conditions, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently disclosed subject-matter.

About: The term "about", when used herein in reference to a value, refers to a value that is similar, in context to the referenced value. In general, those skilled in the art, familiar with the context, will appreciate the relevant degree of variance encompassed by "about" in that context. In an embodiment, "about" means a range encompassing +/−10% of the reference value. In an embodiment, "about" means a range encompassing +/−5% of the reference value.

Associated with: Two events or entities are "associated" with one another, as that term is used herein, if the presence, level and/or form of one is correlated with that of the other. For example, a particular entity (e.g., polypeptide, genetic signature, metabolite, microbe, etc) is considered to be associated with a particular disease, disorder, or condition, if its presence, level and/or form correlates with incidence of and/or susceptibility to the disease, disorder, or condition (e.g., across a relevant population). In some embodiments, two or more entities are physically "associated" with one another if they interact, directly or indirectly, so that they are and/or remain in physical proximity with one another. In some embodiments, two or more entities that are physically associated with one another are covalently linked to one another; in some embodiments, two or more entities that are physically associated with one another are not covalently linked to one another but are non-covalently associated, for example by means of hydrogen bonds, van der Waals interaction, hydrophobic interactions, magnetism, and combinations thereof.

Comparable: As used herein, the term "comparable" refers to two or more agents, entities, situations, sets of conditions, etc., that may not be identical to one another but that are sufficiently similar to permit comparison there between so that one skilled in the art will appreciate that conclusions can reasonably be drawn based on differences or similarities observed. In some embodiments, comparable sets of conditions, circumstances, individuals, or populations are characterized by a plurality of substantially identical features and one or a small number of varied features. Those of ordinary skill in the art will understand, in context, what degree of identity is required in any given circumstance for two or more such agents, entities, situations, sets of conditions, etc. to be considered comparable. For example, those of ordinary skill in the art will appreciate that sets of circumstances, individuals, or populations are comparable to one another when characterized by a sufficient number and type of substantially identical features to warrant a reasonable conclusion that differences in results obtained or phenomena observed under or with different sets of circumstances, individuals, or populations are caused by or indicative of the variation in those features that are varied.

Composition: Those skilled in the art will appreciate that the term "composition", as used herein, can be used to refer to a discrete physical entity that comprises one or more specified components. In general, unless otherwise specified, a composition can be of any form—e.g., gas, gel, liquid, solid, etc.

Comprising: A composition or method described herein as “comprising” one or more named elements or steps is open-ended, meaning that the named elements or steps are essential to a particular aspect or embodiment, but other elements or steps can be added within the scope of the composition or method. To avoid prolixity, it is also understood that any composition or method described as “comprising” (or which “comprises”) one or more named elements or steps also describes the corresponding, more limited composition or method “consisting essentially of” (or which “consists essentially of”) the same named elements or steps, meaning that the composition or method includes the named essential elements or steps and can also include additional elements or steps that do not materially affect the basic and novel characteristic(s) of the composition or method. It is also understood that any composition or method described herein as “comprising” or “consisting essentially of” one or more named elements or steps also describes the corresponding, more limited, and closed-ended composition or method “consisting of” (or “consists of”) the named elements or steps to the exclusion of any other unnamed element or step. In any composition or method disclosed herein, known or disclosed equivalents of any named essential element or step can be substituted for that element or step.

“Improved,” “increased” or “reduced”: As used herein, these terms, or grammatically comparable comparative terms, indicate values that are relative to a baseline value or reference measurement. For example, in some embodiments, an assessed value achieved with an agent of interest may be “improved” relative to that obtained or expected in the absence of treatment or with a comparable reference agent or control. Alternatively, or additionally, in some embodiments, an assessed value achieved with an agent of interest may be “improved” relative to that obtained in the same subject or system under different conditions (e.g., prior to or after an event such as administration of an agent of interest), or in a different, comparable subject (e.g., in a comparable subject or system that differs from the subject or system of interest). In some embodiments, comparative terms refer to statistically relevant differences (e.g., that are of a prevalence and/or magnitude sufficient to achieve statistical relevance). Those skilled in the art will be aware, or will readily be able to determine, in a given context, a degree and/or prevalence of difference that is required or sufficient to achieve such statistical significance.

Reference: As used herein describes a standard or control relative to which a comparison is performed. For example, in some embodiments, an agent, animal, individual, population, sample, sequence or value of interest is compared with a reference or control agent, animal, individual, population, sample, sequence or value. In some embodiments, a reference or control is tested and/or determined substantially simultaneously with the testing or determination of interest. In some embodiments, a reference or control is a historical reference or control, optionally embodied in a tangible medium. Typically, as would be understood by those skilled in the art, a reference or control is determined or characterized under comparable conditions or circumstances to those under assessment. Those skilled in the art will appreciate when sufficient similarities are present to justify reliance on and/or comparison to a particular possible reference or control.

Subject: As used herein, the term “subject” refers to an organism, typically a mammal (e.g., a human). In some embodiments, a subject is suffering from a relevant disease, disorder or condition. In some embodiments, a subject is susceptible to a disease, disorder, or condition. In some embodiments, a subject displays one or more symptoms or characteristics of a disease, disorder or condition. In some embodiments, a subject does not display any symptom or characteristic of a disease, disorder, or condition. In some embodiments, a subject is someone with one or more features characteristic of susceptibility to or risk of a disease, disorder, or condition. In some embodiments, a subject is a subject. In some embodiments, a subject is an individual to whom diagnosis and/or therapy is and/or has been administered.

Sample: a composition of matter to be ejected or retained in the subject device. This composition can comprise the buffer solution (a liquid) and its constituents (additives that modify the liquid properties such as density, viscosity, surface tension, or speed of sound and/or additives that are needed to support biological materials, among others), along with any species (cells or particles, among others) to be retained/agglomerated or ejected.

Sample in need thereof: a sample in need thereof can be a sample as described herein for which ejection through structures as described herein is desired. In certain aspects, the sample in need thereof can comprise particles. In certain aspects, the particles can be biological cells. In certain aspects, the biological cells can be porated so that a substance can be inserted into the cell.

Discussion

As described herein, particle aggregation effects in devices capable of acoustically driving fluids comprising particles (without being limited, also referred to herein as acoustically driven fluid ejector devices, acoustic driven fluid ejector devices, acoustic wave driven ejectors, acoustic devices, or simply “ejector”) and having the ability to produce standing acoustic fields have been investigated, leading to the systems and methods summarized in the following disclosure which address the aforementioned deficiencies and inadequacies. As described herein are embodiments of methods and implementations of reducing particle aggregation in acoustic wave driven ejectors.

Figure 4A:
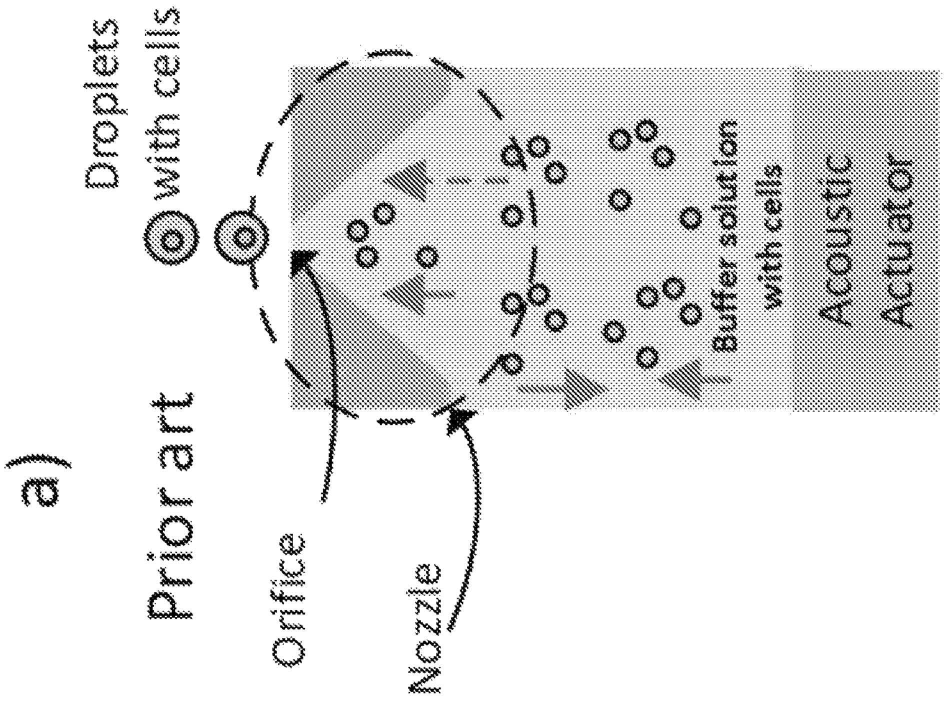
FIGS. 4A-4B.
Figures 5A, 5B, 5C:
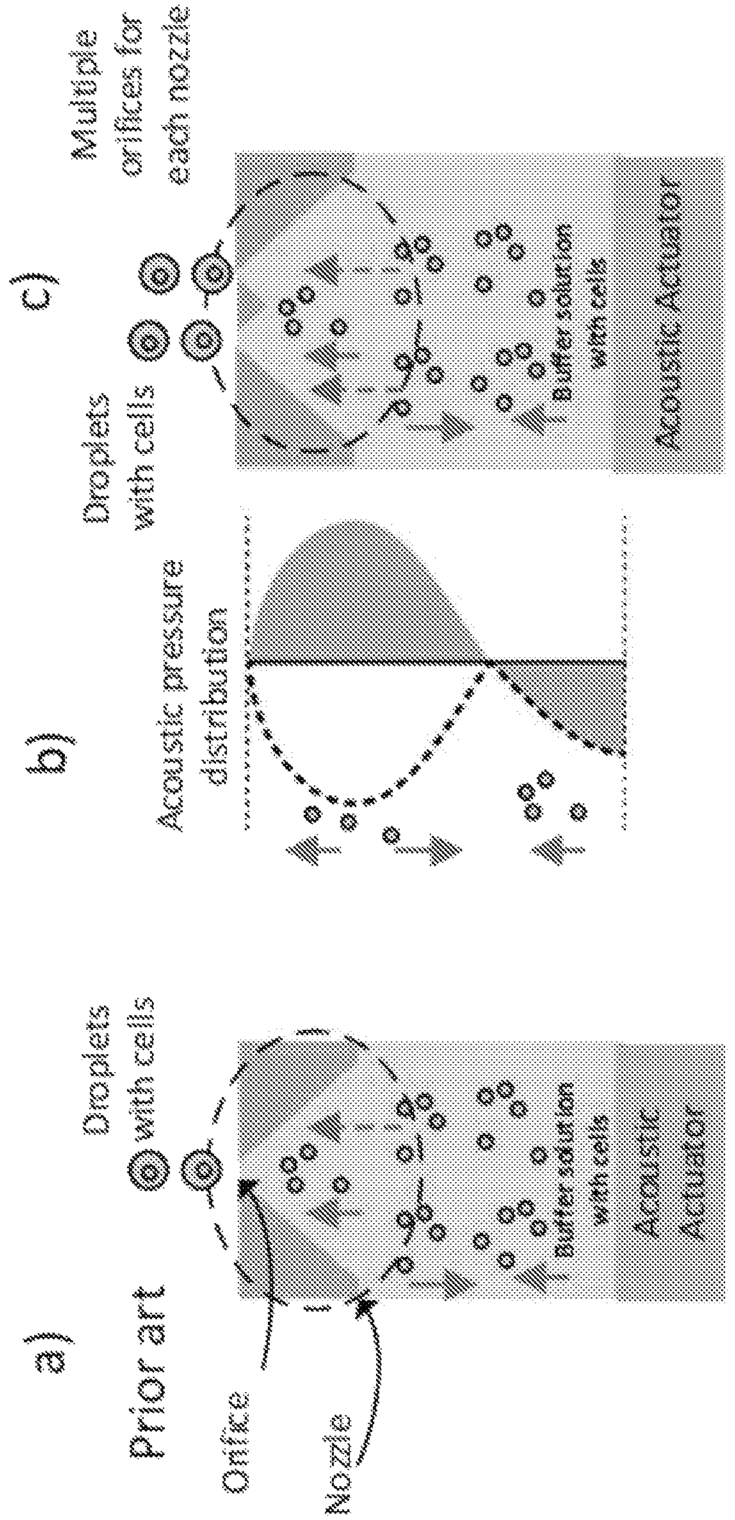
FIGS. 5A-5C.

Based on this background several methods and devices are described to reduce particle retention in acoustic ejectors with reservoirs. As a reference, schematic of a current acoustic ejector is shown in FIG. 4A and FIG. 5A. An acoustically driven fluid ejector can comprise a nozzle plate with one or more orifices, a fluid volume separating the nozzle plate and the acoustic actuator also serving as the reservoir (also referred to herein as a cavity, which is configured to receive a composition comprising particles, the particles being biological cells in an embodiment) and an acoustic actuator generating the acoustic waves in the fluid medium for ejection.

Acoustically driven fluid ejectors as described herein are further described in U.S. Pat. No. 7,704,743, issued on Apr. 27, 2010 and having the title “ELECTROSONIC CELL MANIPULATION DEVICE AND METHOD OF USE THEREOF” and U.S. Pat. No. 9,725,709, issued on Aug. 8, 2017 and having the title “INTRACELLULAR DELIVERY AND TRANSFECTION METHODS AND DEVICES”, both of which are incorporated by reference in their entireties as set forth herein. In an embodiment, an acoustically driven fluid ejector device as described herein is referred to as “POROS”.

Figure 12:
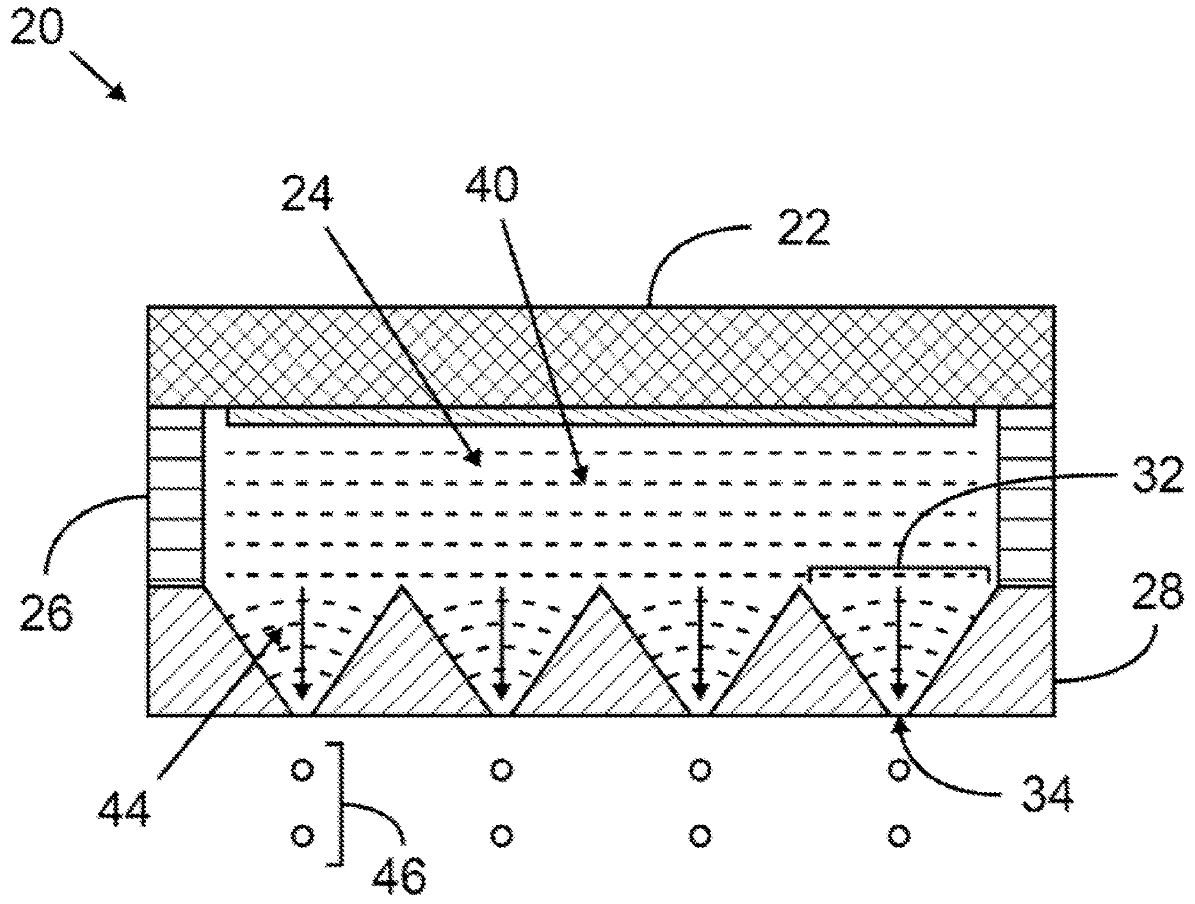
FIG. 12 illustrates a cross-section of an embodiment of an acoustically driven fluid ejector structure as described herein.

FIG. 12 illustrates a cross-section of an embodiment of an acoustically driven fluid ejector structure [20] according to the present disclosure. In an embodiment, the acoustically driven fluid ejector structure can also mechanically permeabilize a cell membrane. The acoustically driven fluid ejector structure [20] includes, but is not limited to, an acoustic actuator [22] and an ejection device [28] that form boundaries on two sides of a sample reservoir [24]. The sample reservoir [24] (i.e. cavity) includes the volume of the ejector structures [32]. The ejection device [28] includes, but is not limited to, an array of ejector structures [32] and the ejector orifices [34]. A fluid sample can be disposed in the reservoir [24] and in the ejector structures [32]. Upon actuation of the actuator [22], a resonant ultrasonic wave [40] can be produced within the reservoir [24] and fluid sample. The resonant ultrasonic wave [40] couples to and transmits through the liquid and is focused by the ejector structures [32] to form a pressure gradient [44] within the ejector structures [32]. The high-pressure gradient [44] accelerates fluid out of the ejector structure [32] to produce droplets or a continuous jet of ejected fluid sample [46]. The period of the drive signal applied to the actuator [22] dictates, at least in part, the rate at which fluid sample is ejected.

In general, the material from which the ejector device [28] is made can have a substantially higher acoustic impedance as compared to the fluid sample. The ejection device [28] can be made of materials such as, but not limited to, single crystal silicon (e.g., oriented in the (100), (010), or (001) direction), metals (e.g., aluminum, copper, and/or brass), plastics, silicon oxide, silicon nitride, and combinations thereof.

The ejector structure [32] can have a shape such as, but not limited to, conical, pyramidal, or horn-shaped with different cross-sections. In general, the cross-sectional area is decreasing (e.g., linear, exponential, or some other functional form) from a base of the ejector structure [32] (broadest point adjacent the reservoir) to the ejector orifice [34] in both two and three dimensions. The cross sections can include, but are not limited to, a triangular cross-section and exponentially narrowing. In an embodiment, the ejector structure [32] is a pyramidal shape. In an embodiment, the ejector structure [32] can be a two-dimensional groove terminated by a slot orifice [34] or have a three-dimensional tapered geometry terminated by an arbitrarily-shaped orifice [34] (e.g., circle, square, etc., see below). In another embodiment, geometry of the ejector structure [32] is not tapered, but is terminated by an opening/channel orifice [34] which is of substantially smaller dimension (width or diameter) than the ejector structure [32].

In one embodiment, the ejector structure [32] has acoustic wave focusing properties in order to establish a highly-localized, pressure maximum substantially close to the ejector orifice [34]. This results in a large pressure gradient at the ejector orifice [34] since there is effectively an acoustic pressure release surface at the ejector orifice [34]. Since the acoustic velocity is related to the pressure gradient through Euler's relation, a significant momentum is transferred to the fluid sample volume close to the ejector orifice [34] during each cycle of the acoustic wave in the ejector structure [32]. When the energy coupled by the acoustic wave in the fluid sample volume is substantially larger than the restoring energy due to surface tension, viscous friction, and other sources, the fluid surface is raised from its equilibrium position. Furthermore, the frequency of the waves can be such that there is enough time for the droplet to break away from the surface due to instabilities. Alternatively, the frequency of the waves can be such that the ejection is a continuous jet of the fluid.

The ejector structure [32] has a diameter (at the base of a single structure/nozzle) of about 50 micrometers to 5 millimeters, 300 micrometers to 1 millimeter, and 600 micrometers to 900 micrometers. The distance (height) from the ejector orifice [34] (opening) to the broadest point in the ejector structure [32] (base of the nozzle) is from about 20 micrometers to 4 millimeters, 200 micrometers to 1 millimeter, and 400 micrometers to 600 micrometers.

The ejector orifice [34] size and shape effectively determine the droplet/jet size and the amount of pressure focusing along with the ejector structure [32] geometry (i.e., cavity geometry). The ejector orifice [34] can be formed using various manufacturing techniques as described below and can have a shape such as, but not limited to, circular, polygonal, elliptical, square, rectangle, or rhomboid. The ejector orifice [32] has a diameter of about 50 nanometers to 200 micrometers, 200 nanometers to 100 micrometers, and 1 micrometer to 10 micrometers.

The ejection device [28] can include one ejector structure [32], an (one-dimensional) array of ejector structures [32], or a (two dimensional) matrix of parallel arrays of ejector structures [32]. The ejector structure [32] can include one ejector orifice [34] each or include a plurality of ejector orifices [34] in a single ejector structure [32].

The sample reservoir [24] (i.e. cavity) can be substantially defined by the ejection device [28] and the actuator [22], as well as the distance between the two. The other boundaries can be walls [26] or separation layers to contain the fluid sample in the reservoir [24]. The sample reservoir [24] is an open area connected to the open area of the ejector structures [32] such that the fluid sample is in both areas.

In general, the dimensions of the sample reservoir [24] and the ejector structure [32] can be selected to excite a cavity resonance in the structure at a desired frequency. The structures may have cavity resonances of about 20 kHz to 100 MHz, depending, in part, on fluid type and dimensions and cavity shape, when excited by the actuator [22].

The dimensions of the sample reservoir [24] can be about 100 micrometers to 4 centimeters in width, about 100 micrometers to 4 centimeters in length, and about 100 nanometers to 5 centimeters in height. In addition, the dimensions of the reservoir [24] can be about 100 micrometers to 2 centimeters in width, about 100 micrometers to 2 centimeters in length, and about 1 micrometer to 3 millimeters in height. Further, the dimensions of the reservoir [24] can be about 100 micrometers to 1 centimeter in width, about 100 micrometers to 1 centimeter in length, and about 100 micrometers to 2 millimeters in height.

In an embodiment, the actuator [22] can produce a resonant ultrasonic wave [40] within the reservoir [24] and fluid sample. As mentioned above, the resonant ultrasonic wave [40] couples to and transmits through the liquid and is focused by the ejector structures [32] to form a pressure gradient within the ejector structure [32]. If the orifices [34] are open for ejection, the high-pressure gradient accelerates fluid out of the orifices [34] from the ejector structure [32] to produce ejection. Ejection can produce discrete droplets in a drop-on-demand manner or a continuous jet. The frequency at which the droplets are formed is a function of the drive wave form applied to the actuator [22] as well as the fluid, reservoir [24], ejector structure [32], and the ejector orifice [34].

Different actuators can be used to drive the self-pumping device and also to produce fluid ejection, including the piezoelectric and capacitive type (e.g., CMUT). An alternating voltage is applied to the actuator [22] to cause the actuator [22] to produce the resonant ultrasonic wave [40]. The actuator [22] can operate at about 20 kHz to 100 MHz (about 30 kHz to 90 MHz, about 40 kHz to 80 MHz, about 50 kHz to 70 MHz, about 60 MHz), about 500 kHz to 15 MHz, and about 800 kHz to 5 MHz. A direct current (DC) bias voltage can also be applied to the actuator [22] in addition to the alternating voltage. In embodiments where the actuator [22] is piezoelectric, this bias voltage can be used to prevent depolarization of the actuator [22] and also to generate an optimum ambient pressure in the reservoir. In embodiments where the actuator [22] is electrostatic, the bias voltage is needed for efficient and linear operation of the actuator [22]. Operation of the actuator [22] is optimized within these frequency ranges in order to match the cavity resonances, and depends on the dimensions of and the materials used for fabrication of the sample reservoir [24] and the ejection device [28] as well the acoustic properties of the fluid sample.

The actuator [22] can include, but is not limited to, a piezoelectric actuator and a capacitive actuator. The piezoelectric actuator and the capacitive actuator are described in X. C. Jin, I. Ladabaum, F. L. Degertekin, S. Calmes and B. T. Khuri-Yakub, "Fabrication and Characterization of Surface Micromachined Capacitive Ultrasonic Immersion Transducers", IEEE/ASME Journal of Microelectromechanical Systems, 8, pp. 100-114 (1999) and Meacham, J. M., Ejimofor, C., Kumar, S., Degertekin F. L., and Fedorov, A., "A Micromachined Ultrasonic Droplet Generator Based on Liquid Horn Structure", Rev. Sci. Instrum., 75 (5), 1347-1352 (2004), both of which are entirely incorporated herein by reference.

One particular embodiment that enables low power input ejection of the fluid is resonant, ultrasonically driven atomization which operates by providing an AC electrical signal to the actuator [22] (piezoelectric transducer) with a frequency equal to the resonance of the fluid filled cavity (sample reservoir [24] and set of ejector structures [32]). The resonant acoustic wave [40] in the fluid in the sample reservoir [24] is focused by the ejector structures [32] (e.g., pyramidal nozzles), creating a high pressure gradient at the ejector structure orifice [34], and thus ejecting the fluid that fills the nozzle cavity. Since the ejector structures [32] can be fabricated using micromachining techniques the orifice [34] size is well controlled, resulting in monodisperse droplet ejection for precise flow rate control. Additional details regarding ultrasonically driven atomization are described in publications (Meacham, J. M., Ejimofor, C., Kumar, S., Degertekin F. L., and Fedorov, A., 2004, "A Micromachined Ultrasonic Droplet Generator Based on Liquid Horn Structure", Review of Scientific Instruments, Vol. 75, No. 5, pp. 1347-1352; Meacham, J. M., Varady, M., Degertekin F. L., and Fedorov, A., 2005, "Droplet Formation and Ejection from a Micromachined Ultrasonic Droplet Generator: Visualization and Scaling", Physics of Fluids, Vol. 17, No. 10, pp. 100605-100613; Meacham, J. M., Varady, M., Esposito, D., Degertekin, F. L., and Fedorov, A., "A Micromachined Ultrasonic Atomizer For Liquid Fuels", Atomization and Sprays, 18, pp. 163-190 (2008)), each of which is entirely incorporated herein by reference.

The dimensions of the actuator [22] can depend on the type of actuator used. For embodiments where the actuator [22] is a piezoelectric actuator, the thickness of the actuator [22] is determined, at least in part, by the frequency of operation and the type of the piezoelectric material. The thickness of the piezoelectric actuator is chosen such that the thickness of the actuator [22] is about half the wavelength of longitudinal waves in the piezoelectric material at the frequency of operation. Therefore, in case of a piezoelectric actuator, the dimensions of the actuator [22] are about 100 micrometers to 10 centimeters in width, about 10 micrometers to 1 centimeter in thickness, and about 100 micrometers to 10 centimeters in length. In addition, the dimensions of the actuator [22] are about 100 micrometers to 2 centimeters in width, about 10 micrometers to 5 millimeters in thickness, and about 100 micrometers to 2 centimeters in length. Further, the dimensions of the actuator [22] are about 100 micrometers to 1 centimeter in width, about 10 micrometers to 2 millimeters in thickness, and about 100 micrometers to 1 centimeter in length.

In embodiments where the actuator [22] is a capacitive actuator, the actuator [22] is built on a wafer made of silicon, glass, quartz, or other substrates suitable for microfabrication, where these substrates determine the overall thickness of the actuator [22]. Therefore, in case of a capacitive microfabricated ultrasonic transducer (CMUT) and CMUT arrays, the dimensions of the actuator [22] are about 10 micrometers to 4 centimeters in width (or about 500 micrometers to about 3.5 centimeters, about 1000 micrometers to about 3 centimeters or about 2000 micrometers), about 10 micrometers to 2 millimeter in thickness, and about 10 micrometers to 4 centimeters in length. In addition, the dimensions of the actuator [22] are about 100 micrometers to 2 centimeters in width, about 10 micrometers to 1 millimeter in thickness, and about 100 micrometers to 2 centimeters in length. Further, the dimensions of the actuator [22] are about 100 micrometers to 1 centimeter in width (or about 200 micrometers to about 900 micrometers, about 300 micrometers to about 800 micrometers, about 400 micrometers to about 700 micrometers, about 500 micrometers to about 600 micrometers), about 10 micrometers to 600 micrometers in thickness (or about 50 micrometers to about 550 micrometers, about 100 micrometers to about 500 micrometers, about 150 micrometers to about 450 micrometers, about 200 micrometers to about 400 micrometers, about 250 micrometers to about 350 micrometers, or about 300 micrometers), and about 100 micrometers to 1 centimeter in length (or about 200 micrometers to about 900 micrometers, about 300 micrometers to about 800 micrometers, about 400 micrometers to about 700 micrometers, about 500 micrometers to about 600 micrometers).

The fluid sample can be liquids such as, but not limited to, water, methanol, dielectric fluorocarbon fluid, organic solvent, cell culture media, buffer solutions, electroporation buffers, or other liquids, and combinations thereof. Fluid samples can also include suspensions of biological cells. In certain embodiments, a fluid sample in a sample reservoir in between the ejector plate (or ejector structure) and biocompatible structure (or film) comprises a sample with a suspension of biological cells, and a fluid sample in a fluid reservoir in between the biocompatible structure (or film) and actuator, opposite the sample reservoir, comprises a fluid without cells, particles, or flow.

In certain aspects, if the fluid sample (also referred to herein as "sample") contains biological cells (for example biological cells in suspension), ejection from the orifices [34] of the ejection device [28] can provide a mechanical shear force that induces a tension in the cell membranes. Provided the induced membrane tension exceeds a certain threshold value, cells can be either reversibly porated for cargo molecule delivery or irreversibly porated leading to eventual cell death or immediate cell lysis.

Figures 2A, 2B, 2C, 2D:
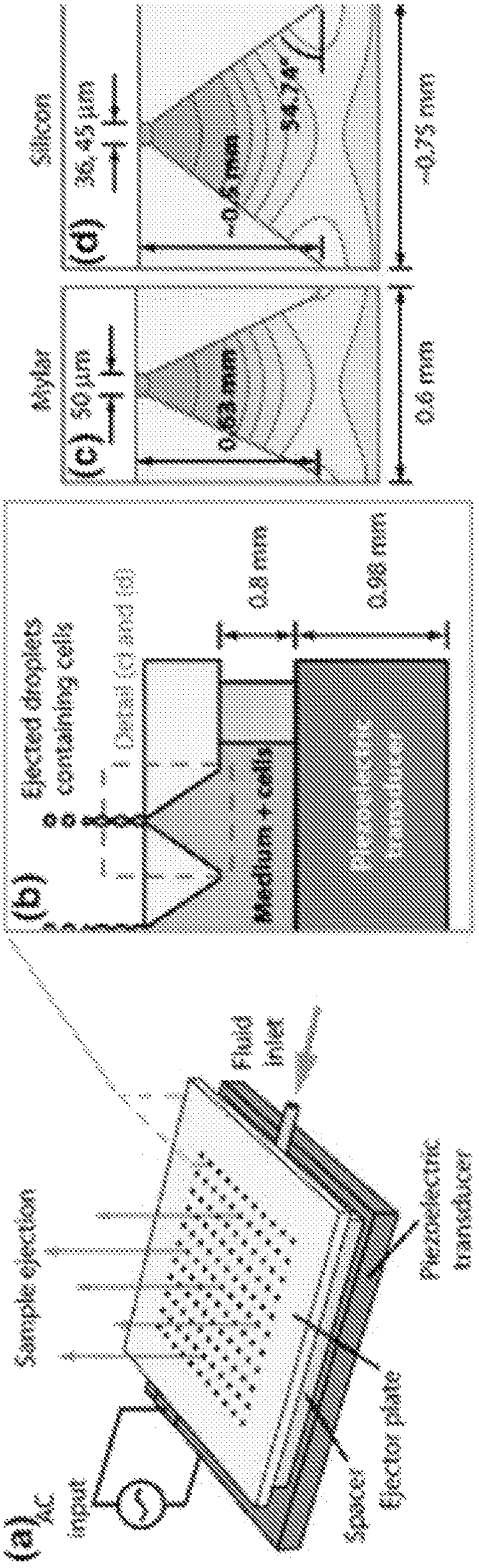
FIGS. 2A-D represent typical structure and dimensions of embodiments of acoustically driven ejector structures which can be used for a variety of purposes, such as for cell mechanoporation, for example.
Figures 3A, 3B, 3C, 3D, 3E, 3F, 3G, 3H:
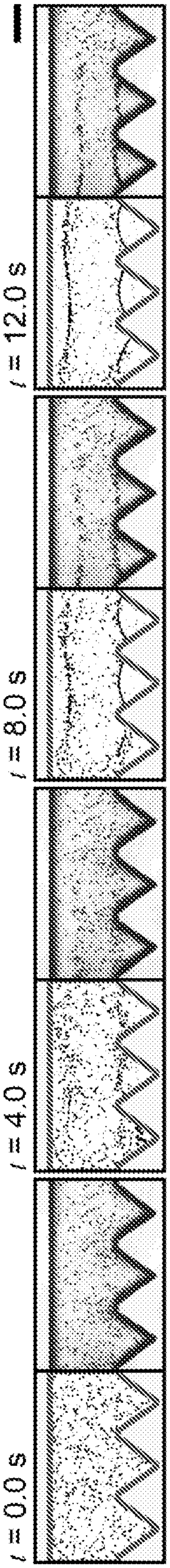
FIGS. 3A-3H shows simulated (left) and visualized (right) particle distributions at the second resonance mode of an acoustic fluid ejector at t=0.0 s (FIGS. 3A-3B), t=4.0 s (FIGS. 3C-3D), t=8.0 s (FIGS. 3E-3F), and t=12.0 s (FIGS. 3G-3H). Both the simulation and a visualization experiment for the second mode show that it can take some time for the particles to aggregate at the pressure nodes depending on acoustic amplitude, particle size, and properties.

Additional aspects of embodiments of acoustically driven fluid ejector devices are shown in FIGS. 2A-2G. FIGS. 2A-D represent typical structure and dimensions of embodiments of acoustically driven ejector structures which can be used for a variety of purposes, such as for cell mechanoporation, for example. FIGS. 2E-2G represent the three-dimensional (3D) nature of an embodiment of ejector nozzle plates of an acoustically driven ejector structure as described herein formed in mylar and silicon wafer. The scale bar is 1 mm.

Figure 4B:
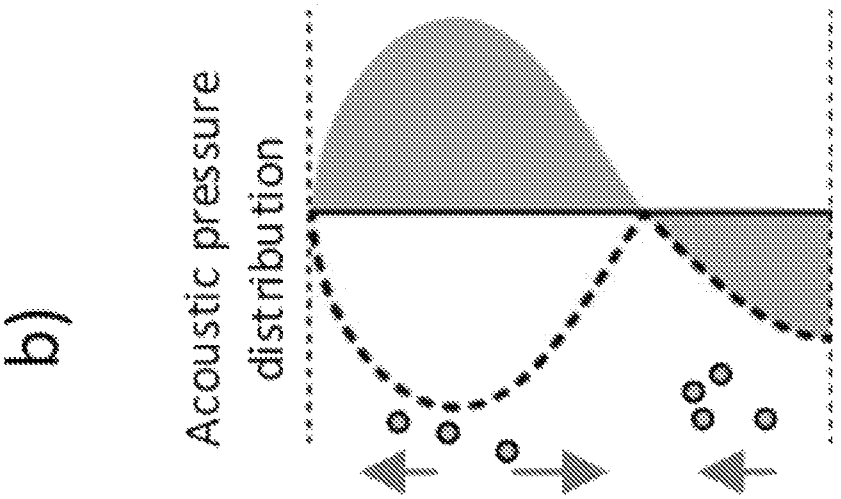

A representative pressure distribution in the fluid along the vertical axis under the orifice is also shown in FIG. 4B as a reference. As discussed earlier, this distribution can cause particles to aggregate at pressure nodes away from the orifice resulting in high particle retention in the reservoir, which can lead to clogging, device failure, and prevention of efficient ejection of the fluid composition.

The present disclosure encompasses and expands upon at least three main points that are used for the suggested solutions to aforementioned particle aggregation of the prior art described herein. These solutions can be applied to structures as described above and as described otherwise herein.

First, the aggregation pattern can be modulated and prevented by rapidly changing the frequency of operation of the ejector because the frequencies of operation (or each period of the acoustic perturbation) are much faster than the aggregation time scales (FIGS. 3A-3H).

Second, acoustophoretic forces can move the cells only in the fluid domain. The acoustic field in the fluid cavity can be such that acoustophoretic forces should move the cells only to the nozzle tip. This solution requires modifications to the nozzle reservoir structure as described below.

Third approach can be to increase the overall self-pumped flow rate in the ejector device in a large portion of the fluid reservoir volume including cells or particles, the fluid drag forces are larger than the acoustophoretic forces. Since the drag forces will move the cells to the nozzle to be ejected, cell retention will be reduced.

Embodiments of the present disclosure can further include any combination of the approaches listed above (for example first and third, first and second, second and third, and all three). Embodiments of the present disclosure further include self-pumping structures and methods as described herein.

In an embodiment according to the present disclosure, the self-pumped flow rate can be increased, for example, by increasing the number of orifices in a nozzle or increasing the nozzle density of the ejector plate. Based on increasing the self-pumped flow rate, the flow induced forces can be increased to overcome acoustophoretic forces in a larger portion of the fluid volume. This can be achieved by increasing the number of orifices in each nozzle as shown in FIGS. 5A-5C. Note that in this case the overall pressure distribution does not change as the boundary conditions are still the same, but more droplets can be ejected at the same operating frequency increasing the flow rate and hence forcing more particles through the orifice. Another embodiment to increase the number of orifices is to use a thinner nozzle plate so that more holes or pyramids can be etched into silicon as (see FIGS. 2A-2G). In terms of the number of orifices, the ratio of the orifice area to the base area of the nozzle can be adjusted. For example, in FIG. 2G, the bottom view shows the nozzle area and the orifice at the tip. For high flow rates and self-pumping, a 50 um diameter orifice over a square nozzle entry with about 700 um side length, the area ratio will be about 0.016. To achieve this type of ratio with smaller orifices, larger number of orifices can be used per nozzle as described. For high flow rates, this ratio can be in the 0.01 to 0.05, in some cases it can be as large as 0.2.

For microarrays fabricated from silicon, the number of nozzles per square millimeter (n/mm2) is fixed by the thickness of the substrate and the crystal structure of the silicon. For a standard 500 urn thickness silicon wafer, one can have ~2 nozzles per square millimeter. With a substrate thickness range of 100 urn to 1 mm the nozzle density can be in the range of from 0.5 to 50 nozzles per square millimeter to adjust the flow rate. The nozzle density can be adjusted by the skilled artisan depending on the sample, fluids used, and end use so that the flow rate of sample through the ejector structures overcomes any drag forces, making the apparatus or method self-pumping.

In other embodiments according to the present disclosure, the acoustic field in the part of the reservoir containing the fluid with cells or particles can be adjusted such that both the acoustophoretic forces and the flow induced drag both move the cells to the nozzle tip. Then there may not be cell retention issues preventing cells from being ejected as long as most of the cells can be ejected with a strong enough acoustic field. This can be achieved by introducing cells to the cavity only in a region where they are located between the last pressure peak and the nozzle tip, while keeping the desired acoustic field distribution in the reservoir.

FIGS. 6A-6C, 7A-7C, 8A-8B, 9A-9B, 10, and 11 illustrate embodiments of the present methods and apparati. A biocompatible material (also referred to herein, depending on the size and material, as a biocompatible structure, a biocompatible film, an acoustically transparent solid) can be placed in the ejector structure so that the cavity pressure node is not in a region where cells can aggregate. In embodiments, this material can be mylar, polydimethylsiloxane, silicone rubber, polyester, polytetrafluoroethylene, Teflon®, or other suitable polymer material (a suitable polymer material is a material would be a polymer material having the same or similar acoustic properties, such as acoustic impedance, to the buffer solution so that it is acoustically transparent to the fluid, and can be chosen by the skilled artisan based on the acoustic properties of the chosen buffer solution(s)). In embodiments, the biocompatible material can be a planar layer that abuts the actuator and is in between the actuator and the ejector nozzles/orifices. In embodiments, the biocompatible material can be a biocompatible film in between the actuator and the ejector nozzles/orifices that creates a sample reservoir on a side of the film facing the ejector nozzles/orifices, and a fluid reservoir (without particles, cells, or flow) on a side of the film facing the actuator. In certain aspects, the side of the biocompatible material that faces the ejector nozzles/orifices can have a geometry that is complementary or substantially complementary to the ejector nozzles.

Figures 6A, 6B, 6C:
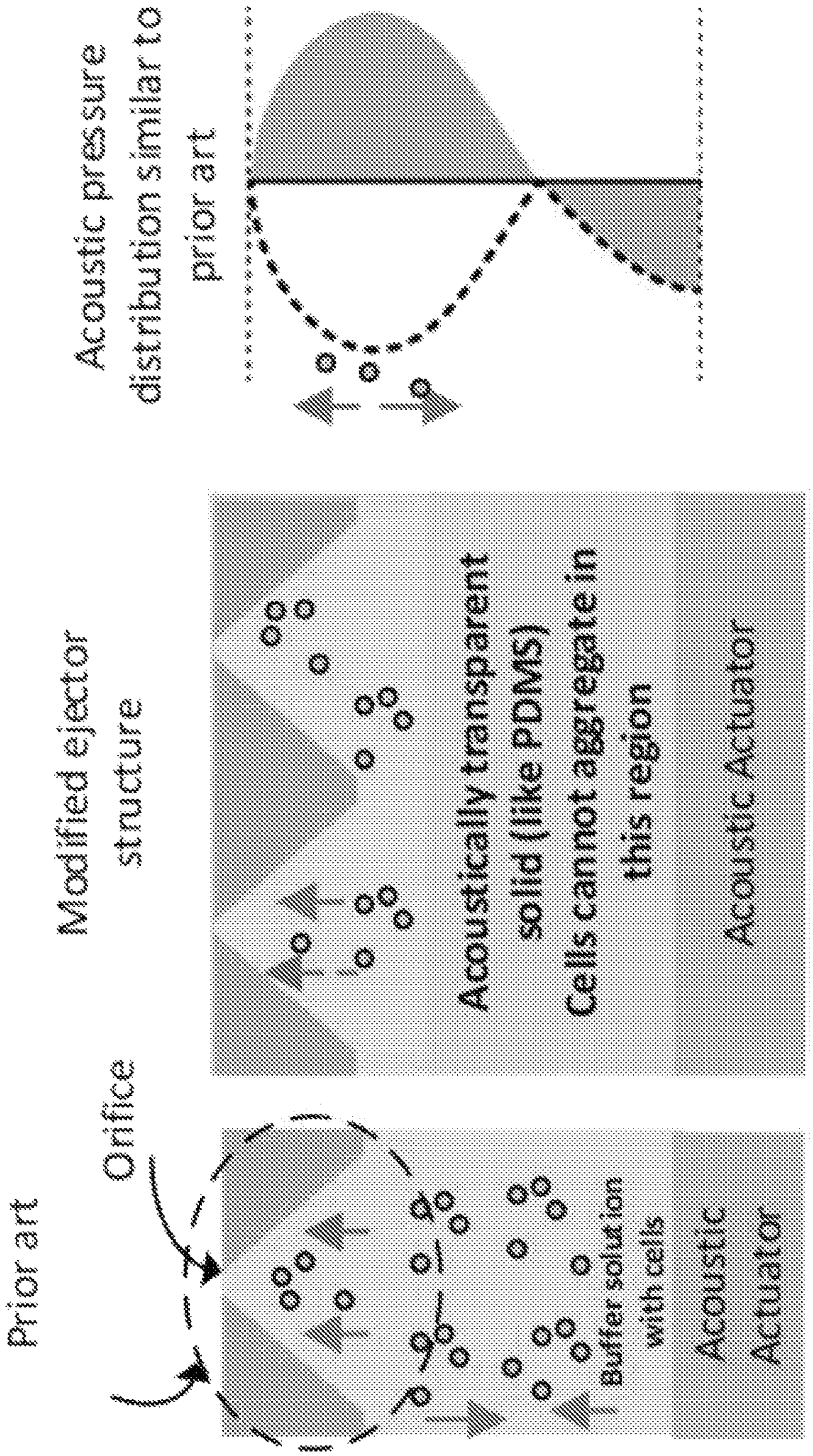
FIGS. 6A-6C.

In order to implement such a solution, the bottom part of the ejector reservoir (cavity) can be filled with a biocompatible material, like polydimethylsiloxane (PDMS), or silicon rubber like RTV-615, RTV-60, that has the same or similar acoustic properties (such as acoustic impedance) to the buffer solution (FIG. 6B). That way the acoustic field distribution is not disturbed significantly as shown by others (Ref. 7) and desired pressure distribution is retained. However, since the cavity pressure node is in the solid region, the cells cannot aggregate at this node and are propelled toward the node at the exit orifice.

Figure 7C:
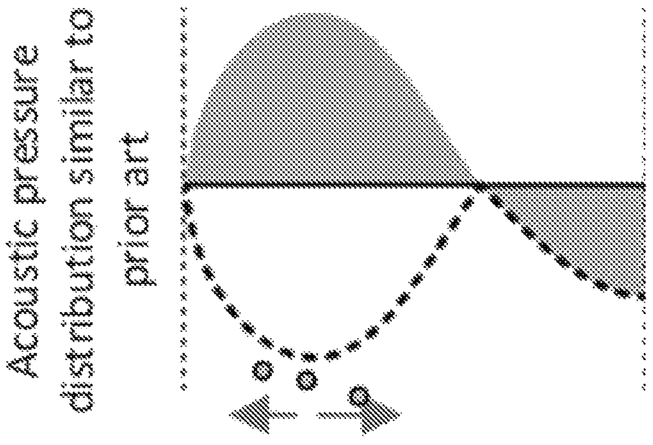
FIGS. 7A-7C.
Figure 7B:
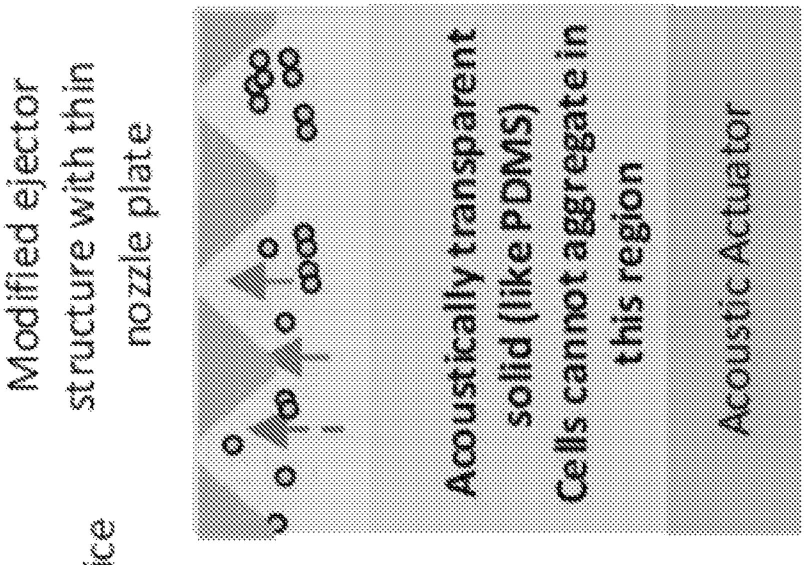
Figure 7A:
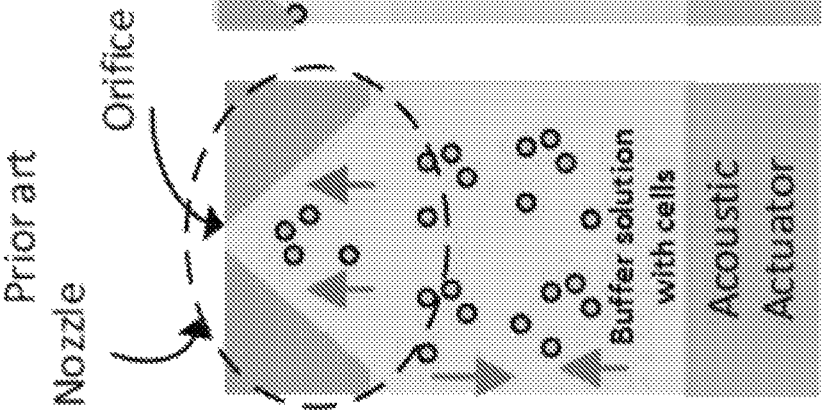

To accommodate this biocompatible, acoustically transparent (to the fluid) material, this material will be added until the pressure peak closest to the nozzle tip is in the solid as shown in FIG. 6B. In addition, the thickness of the solid nozzle plate can be decreased from a typical value of 500 um to a range between 10 um to 300 um (or about 100 micrometers to about 200 micrometers) such that there is a larger vertical space for low lateral flow resistance between the nozzle plate and the solid surface. This is depicted in FIGS. 7A-7C. This embodiment (FIG. 7B) also has the advantage of increasing the number of orifices per area so that flow rate is also higher than the current acoustic ejector.

Figure 8A:
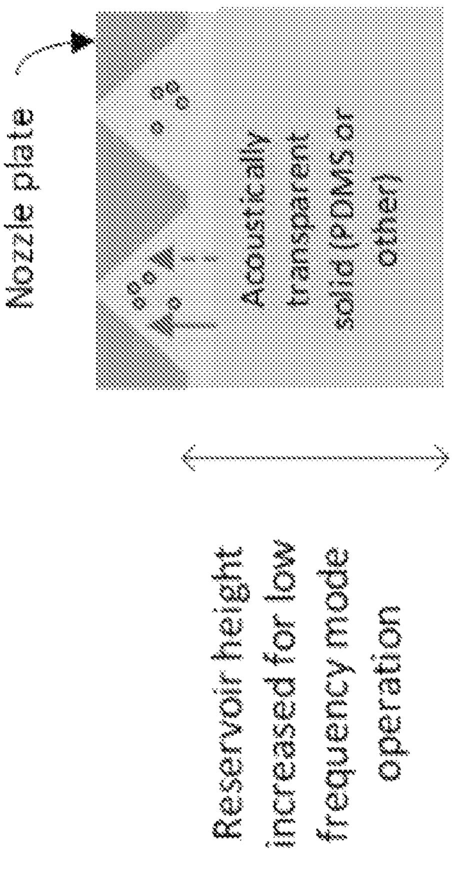
FIGS. 8A-8B.
Figure 8B:
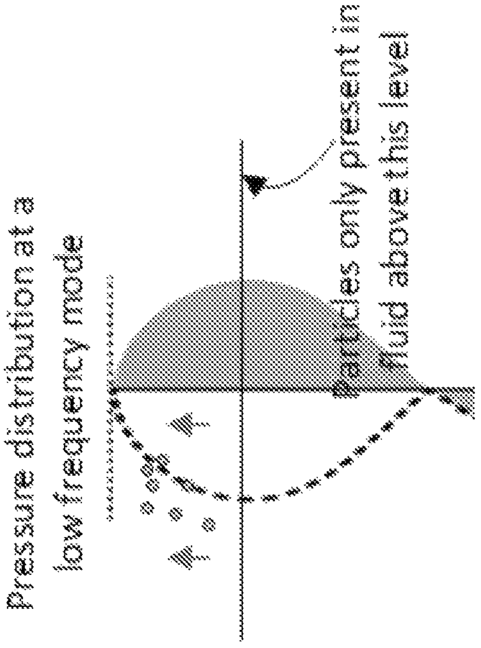

If the flow resistance is high, the frequency of operation can be reduced to move the pressure peak and solid surface away from the nozzle tip. This may reduce the overall flow rate, but this can be overcome by introducing a larger number of nozzles/orifices in the nozzle plate as described earlier. This will be a natural solution for a thinner silicon nozzle plate. Having shorter nozzles can reduce the acoustic focusing, but the amplitude of the piezoelectric transducer input can be increased to make up for the acoustic pressure drop. All of these parameters can be optimized through 2D and 3D analysis. An example embodiment is shown in FIGS. 8A-8B. By reducing the frequency from 700 kHz-2 MHz range to 200 kHz-500 kHz range, the pressure peak location can be significantly lowered. To match the mode frequency to the desired frequency of operation, the height of the reservoir is increased to have a lower frequency mode, such that the total vertical cavity is in the order of half a wavelength and the solid surface is about quarter wavelength (of the acoustic waves in the fluid) away from the orifice at the frequency of operation.

In certain embodiments according to the present disclosure, materials other than PDMS such as elastomers, silicon rubber like RTV-615, RTV-60, and the like that has the same or similar acoustic properties (such as acoustic impedance) can be used in order to accomplish the same result. Any other better acoustically matching materials with different sound speeds could be used and the pressure node position will depend on the sound speed in the solid material.

Figure 9A:
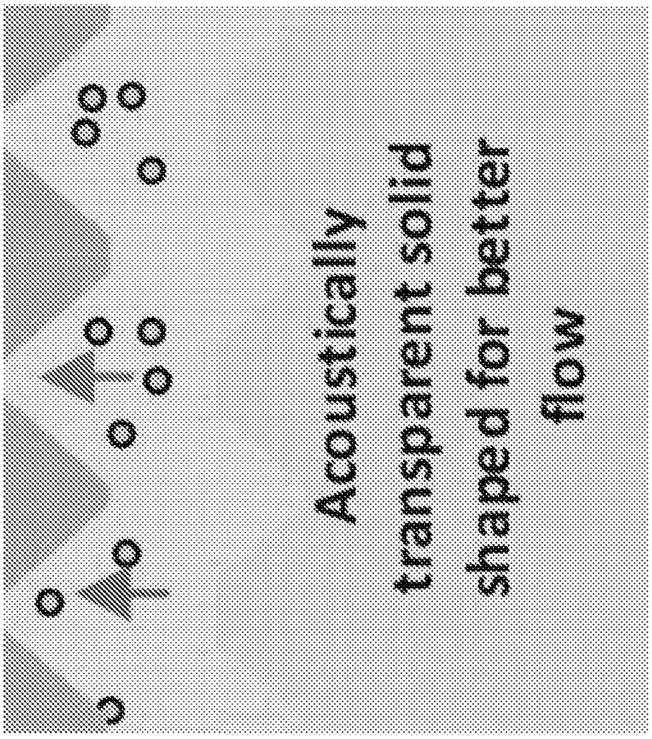
FIGS. 9A-9B.
Figure 9B:
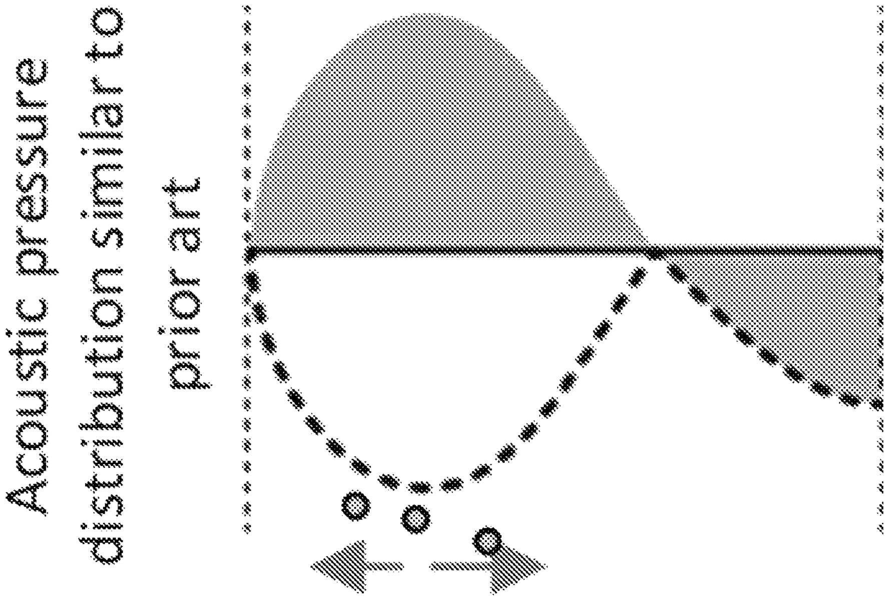

In other embodiments according to the present disclosure, the shape of the solid material can be changed in 3 dimensions (thickness reduced in between the nozzles). These shapes can be similar to the nozzle shapes such as pyramidal structures as shown in FIGS. 9A-9B. The changes are such that it improves flow pattern and reduces flow resistance while still having the acoustophoretic forces pointing mostly to the orifice area. The amount of flow is important to retain the self-pumping nature of the acoustic ejector. In addition, the nozzle shape can be changed to optimize the position of the pressure peak.

Figure 10:
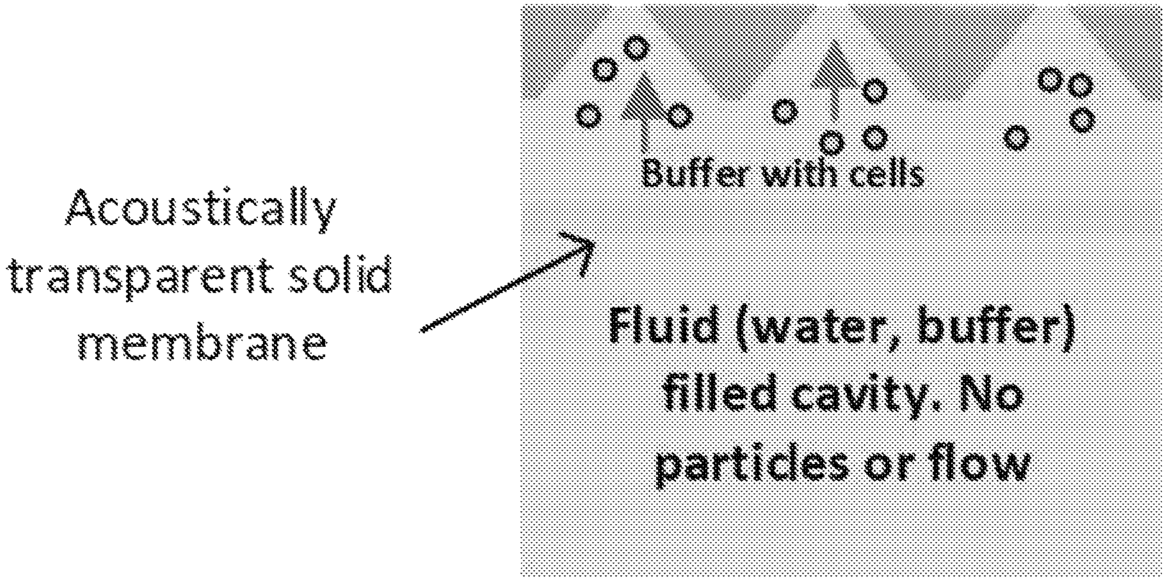
FIG. 10 depicts an embodiment of an acoustically driven fluid ejector structure with acoustically transparent solid membrane layer. The cells are present only at the region close to the nozzles, facilitating efficient ejection and minimizing the possibility of aggregation in other regions of the ejector structure.

Yet another embodiment to reduce detrimental effects of the acoustophoretic force effects for particle retention is to divide the fluid reservoir into two fluid filled sections separated by an acoustically transparent thin layer (also referred to herein as a film or a biocompatible film). The cells or particles are introduced only in the top fluid layer under the nozzles, whereas the region below the thin later is filled with a fluid like water which is there just to sustain the acoustic field. This fluid can have properties similar to the solution containing the particles or cells to have pressure distributions similar to the case of a uniformly filled cavity. This is depicted in FIG. 10. The solid layer can be made of materials similar to PDMS so that its impact on the acoustic pressure distribution is minimized. The vertical location of the membrane would be determined according to the pressure distribution similar to the solid structures of FIG. 8A and FIG. 9A. The membrane structure can be an integral part of the nozzle plate or it can be integrated with the reservoir and actuator so that it can be used with different nozzle plates.

Figure 11:
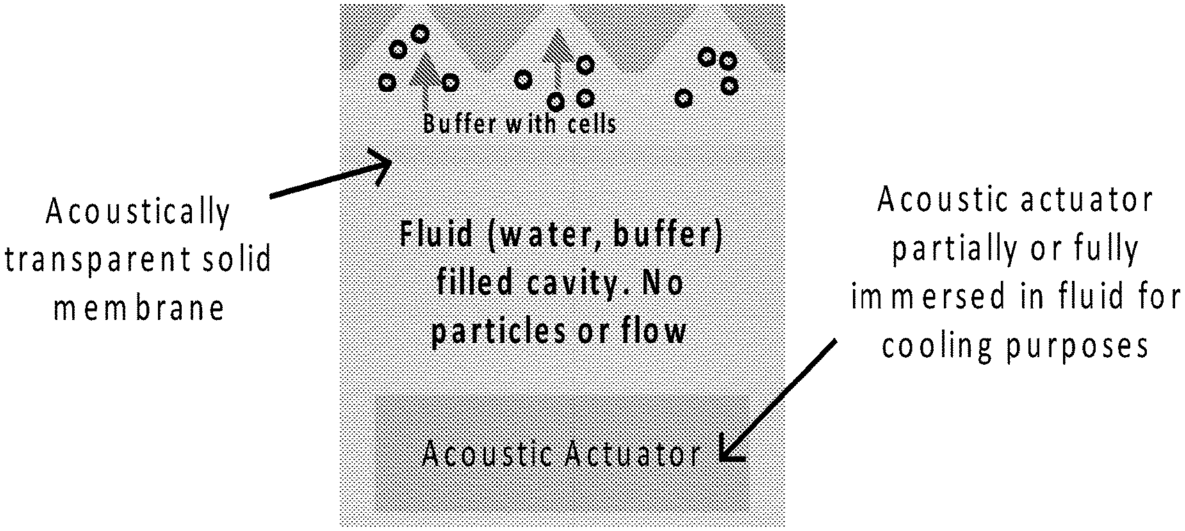
FIG. 11 depicts an embodiment of an acoustically driven fluid ejector structure with acoustically transparent solid membrane layer. The cells are present only at the region close to the nozzles, facilitating efficient ejection and minimizing the possibility of aggregation in other regions of the ejector structure. Furthermore, the acoustic actuator is partially or completely immersed in the fluid beneath the acoustically transparent solid membrane layer for cooling purposes.

As depicted in FIG. 11, the acoustic actuator can be in direct contact with the fluid underneath the solid membrane separating the solution containing particles from the fluid without particles. This fluid without particles, directly in contact with the acoustic actuator can be used to cool the acoustic actuator to control the temperature of the actuator. This fluid can be circulated for cooling purposes without impacting the acoustic field distribution.

Based on the fact that there it takes certain time to get the particles aggregate under the influence of acoustophoretic forces (see FIGS. 3A-3H), an embodiment according to the present disclosure is a method of using a chirp (frequency sweep) excitation of the actuator around 200 to 2000 kHz range (or 500 to 1500 kHz, or 1000 kHz) rapidly (within 1-100 ms) to eject the fluid during the sweep, while not allowing a clear standing aggregation pattern to develop in the fluid reservoir. The amplitude at each frequency and frequency sweep time can be optimized. This is effectively introducing alternating acoustic mixing and ejection combined operation. Since the ejection does not happen all the time, the flow rate will be lower but it can be balanced by introducing multiple ejection orifices by either having multiple orifices as in FIG. 5B, or using a thinner nozzle plate as in FIG. 7B.

In certain embodiments according to the present disclosure, it may be beneficial to use a chirp (frequency sweep) excitation ranges other than 200 to 2000 kHz range, for example between 400 kHz to 900 kHz (or about 500 kHz to about 800 kHz or about 600 kHz to about 700 kHz) around the ejection mode frequency of 700 kHz, either more rapidly (within 1 ms) or less rapidly (longer than 1 ms) to eject during the sweep while not allowing a clear standing aggregation pattern (pressure maxima and minima) to develop. The amplitude at each frequency and frequency sweep time can be optimized. The reduction in ejection rate can be balanced by introducing multiple ejection orifices.

In embodiments according to the present disclosure, frequencies above 2000 kHz can be used, for example up to ~4 MHz (about 2500 kHz, about 3000 kHz, about 3500 kHz). It is noted that mixing frequencies (i.e., those used for multi-modal operation) could be much higher, for example with piezoelectrically-driven bulk acoustic wave systems driven at up to 8 MHz. The exact frequencies corresponding to $1^{st}$, $2^{nd}$, $3^{rd}$, etc. and mixing modes (which may or may not be equivalent to higher cavity "ejection" modes) are a function of the chamber geometry (height, width, etc.), and a frequency excitation utilized could be chosen by the skilled artisan based on chamber geometry.

In some embodiments according to the present disclosure, the frequency of operation can be switched between multiple resonance modes. For example, in FIG. 1A, the ejector cavity has the first two modes around or about 600 kHz and 1.1 MHz resulting in distinct and different particle aggregation patterns (see FIG. 1A-1B, FIGS. 3A-3H). By switching the frequency between these mode frequencies will continuously move the nodal points. The amplitude at these mode frequencies are such that ejection can happen in the desired mode (first or second mode) and the other mode (second or first mode) is excited just to keep cells moving. The input signal amplitudes can be optimized for this mode of operation.

In certain aspects, multiple modes of operation or multiple resonance modes can comprise a first mode and a second mode, and are capable of moving the nodal points whereas, the amplitude is such that ejection of particles happens as a result of the first mode (an ejection mode) and the second mode keeps particles in the sample in need thereof moving (a moving or mixing mode). An "ejection mode" can mean chamber resonances corresponding to maxima in the tip pressure gradient, and ejection modes can exhibit roughly horizontal striations in the pressure field.

In some embodiments according to the present disclosure, introduction of lateral waves superimposed on top the transverse "pumping" waves may further shake-up the field of nodal structure in the cavity. The lateral waves can be introduced by the same actuator that drives ejection. An example using an embodiment of device architecture is shown in FIG. 10 top/left image of the predicted pressure field at f=1.055 MHz of the reference 6 below (A. D. Ledbetter, H. N. Shekhani, M. M. Binkley and J. M. Meacham, "Tuning the Coupled-Domain Response for Efficient Ultrasonic Droplet Generation," *IEEE Transactions on Ultrasonics, Ferroelectrics, and Frequency Control*, vol. 65, no. 10, pp. 1893-1904, October 2018), which is incorporated by reference in its entirety as set forth herein.

In other embodiments according to the present disclosure, it is possible to generate acoustic pumping by introducing traveling waves at a different frequency. This can help with the self-pumping function. Examples of this type of traveling waves generated by CMUTs can be found, for example, in Ref. 8 below (McLean, J., & Degertekin, F. L. (2004). Directional scholte wave generation and detection using interdigital capacitive micromachined ultrasonic transducers. IEEE transactions on ultrasonics, ferroelectrics, and frequency control, 51(6), 756-764.), which is incorporated by reference in its entirety as set forth herein In certain embodiments according to the present disclosure, it may be possible to use multiple frequencies at the same time by changing the pattern of transducer (piezo, or CMUT or piezoelectric micromachined ultrasonic transducer) electrodes and the electronics of the device. Examples of this type electrode shaping and drive electronics by CMUTs can be found in Ref. 8. One example would be to take our current actuator, and pattern the electrodes on top bottom such that two halves of the piezo could be driven by different signals (e.g., same frequency but different polarity, same frequency but different phase, or different frequencies, etc.).

Embodiments of systems and methods as described herein can be coupled with electric fields (created by electrodes and a voltage generator) for cell electroporation and electrophoretic insertion. Electrodes of systems and methods as described herein can be suspended electrodes (i.e. wire electrodes) placed within the sample media in the cavity and within the nozzles, which can be energized to provide an extra action via electroporation and electrophoresis.

An electrode or an array of electrodes could be placed within fluid sample which is disposed in the reservoir [24] and in the ejector structures [32]. In embodiments, the electrodes can be located in the vicinity of the ejector orifices. The electric potential could be applied to the electrodes, the same for all electrodes or different and individually controlled at each electrode, such that an electric field is produced within a sample that causes either or both the cell electroporation or electrophoretic transport of cargo (molecules, ions and cellular or sub-cellular structures). The electric potential applied to the electrode could AC (alternating current) or DC (direct current), and its magnitude can depend on the specific dimensions of an electrode, a sample reservoir, an ejector structure and an ejector orifice, as well as the nature of the sample (e.g., electrical/ionic conductivity and electrical permittivity), type of cells, and the type of delivery cargo. It could range from about 0 to about 400V/m (electroporation threshold; or about 50V/m to about 350V/m, about 100V/m to about 300V/m, about 150V/m to about 250V/m, or about 200V/m) to produce only electrophoretic transport or above ~400V/m to induce cell electroporation (the value of the electroporation threshold used here is a commonly accepted value as laid out in Kranjc M., Miklavčič D. (2017) Electric Field Distribution and Electroporation Threshold. In: Miklavčič D. (eds) Handbook of Electroporation. Springer, Cham, which is incorporated by reference in its entirety as set forth herein, but it can be adjusted for different cell types and sample buffer media).

This embodiment is complimentary to other systems and methods as described herein, but previously the electrodes were part of the ejector/nozzle structure and their counter electrode was placed in gas phase above the ejector. In an embodiment, the electrodes may or may not be part of the nozzle structure, but the active electrode is placed within the sample in the ejector cavity or within the nozzle.

In some embodiments according to the present disclosure, the number of nozzles or orifices or orifices/nozzle per area can be increased by reducing the thickness of the silicon nozzle plate. Having shorter nozzles (i.e. reducing the nozzle height) can reduce the acoustic focusing, but the amplitude of the piezoelectric transducer input can be increased to make up for the acoustic pressure drop so that the ejector can be kept in self-pumping state.

In certain embodiments, mitigating cell retention and/or aggregation according to systems and methods as described herein can be useful in methods of treatment involving cellular therapy. Cellular therapy can comprise, for example and without intending to be limiting, CART treatments, cellular regeneration treatments, treatments involving induced pluripotent stem cells, and the like.

Advantages of systems and methods as described herein also have advantages for cellular therapy because the efficacy of preparing cells by devices as described herein for use as cellular therapy is increased as a result of decreased aggregation. Clumping can not only cause undesired biochemical changes in cell of interest for cellular therapy, but can lead to failure of the ejector device, and prevention of the desired number of cells from actually being ejected from the device.

Such cellular therapies prepared by systems and methods as described herein could be used as methods of treatment, for example for cancer, stroke, genetic disease, and the like. An example of a method of treatment according to systems and methods as described herein can comprise preparing transgenetic biological cells (i.e. the therapeutic particle or composition) by inserting a substance into said cells with systems and methods as described herein, and delivering the cells to a subject in need thereof (a subject suffering from a disease, such as a cancer or stroke or genetic disease, for example) following ejection from the acoustically driven fluid ejector. Other methods of treatment would be immediately apparent to the skilled artisan based on systems and methods as described herein.

In embodiments according to the present disclosure, systems and methods provided herein allow for more uniform creation of micron- and submicron scale droplets used in applications for the treatment of many diseases including but not limited to cancer, infection, cellular therapy, and regenerative medicine. As such, provided methods and compositions may increase the quality of life for sufferers of these indications as a result of treatments comprising the uniform droplets comprising the therapeutic particle (which can be a biological cell).

In embodiments according to the present disclosure, methods provided herein allow for more uniform creation of micron- and submicron scale droplets which are critical to a diversity of industrial applications such as but not limited to fuel processing, nanomaterial synthesis and manufacturing. This can be a result of more efficient particle mixing within fluids from which droplets are created and more efficient particle ejection due to lack of aggregation within the reservoir/cavity of the ejector.

While embodiments of the present disclosure are described in connection with the Examples and the corresponding text and figures, there is no intent to limit the disclosure to the embodiments in these descriptions. On the contrary, the intent is to cover all alternatives, modifications, and equivalents included within the spirit and scope of embodiments of the present disclosure.

Other features, objects, and advantages of the present invention are apparent in the description that follows. It should be understood, however, that the description, while exemplifying certain embodiments of the present invention, is given by way of illustration only, not limitation. Various changes and modifications within the scope of the invention will become apparent to those skilled in the art from the detailed description.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

Particle aggregation at tips of nozzles contained in devices capable of producing standing acoustic fields happen when simulated steady state acoustic pressure fields and corresponding experimentally visualized distribution of particles in a 10-μm diameter polystyrene beads (as model cells) in a 2D ejector-like structure with closed nozzle tips.[6] FIGS. 1A-1C show the results at the first and second resonances of the cavity. It can be seen that the particles collect at the pressure nodes and away from the pressure peaks in a direction depending on the slope based on the Gorkov potential.[2] In acoustically driven fluid ejectors as described herein, orifices at the tips of the nozzles are open, creating another pressure node as seen in FIG. 1C, so that particles to the right of the positive pressure peak are pushed to the nozzle tip by acoustophoretic and flow induced forces.

Transient simulations were conducted to find time constants associated with particle motion under transient excitation. FIGS. 3A-3H show time traces of particles. Both the simulation and a visualization experiment for the second mode show that it can take some time for the particles to aggregate at the pressure nodes depending on acoustic amplitude, and particle size and properties.

Example 2

FIG. 7B shows an embodiment of a solution to aggregation in acoustically driven fluid ejectors which shows how the bottom part of the cavity of the acoustically driven fluid ejector can be filled with a biocompatible material, like PDMS, that has the same or similar acoustic properties to the buffer solution. Since the cavity pressure node is in PDMS, the cells cannot aggregate at this node and are propelled toward the node at the exit orifice.

Example 3

Collection of particles in pressure maxima and minima (depending on the particle-specific acoustophoretic contrast factor) of standing acoustic fields is a well-known phenomenon in the field of acoustofluidics. Acoustophoretic effects have been investigated in an embodiment of an acoustic wave-driven fluid ejector (POROS) leading to the engineering solutions summarized below. Several key figures are presented herein to clarify these approaches. FIGS. 1A-1B show the simulated steady state acoustic pressure fields and corresponding experimentally visualized distribution of 10-μm diameter polystyrene beads (as model cells) in a 2D POROS-like structure with closed nozzle tips (Details can be found in Ref. 6, which is incorporated by reference in its entirety herein). These results at the first and second resonances of the cavity show that the particles collect at the pressure nodes and away from the pressure peaks in a direction depending on the slope based on the Gorkov potential (Ref. 7). In POROS, orifices at the tips of the nozzles are open, creating another pressure node as in FIG. 1C, so that particles to the right of the negative pressure peak are pushed to the nozzle tip by acoustophoretic and flow induced forces (red arrows show the forces on particles).

Transient simulations were also performed to find the time constants associated with particle motion under transient acoustic excitation. FIGS. 3A-3H, which are adapted from a recent μTAS conference paper, shows time traces of particles. Both the simulation and a visualization experiment for the second mode show that it takes some time for the particles to aggregate at the pressure nodes depending on acoustic amplitude, and particle size and properties. Therefore, both the standing wave and transient acoustophoretic effects in POROS are understood.

The two main points that are used for the suggested solutions based on this understanding are:

1. The aggregation pattern can be modulated and prevented by rapidly changing the frequency of operation since the frequencies of operation are much faster than the aggregation time scales.
2. Acoustophoretic forces can move the cells only in the fluid domain. The fluid cavity in POROS can be modified such that the acoustic field generated forces move the cells only to the nozzle tip. The spatial periodicity of the acoustic field is predominantly determined by frequency of operation.

Solution Strategies

One set of solutions makes use of point 1 above and requires minimal modification of the current physical POROS configuration and drive electronics. The other set uses point 2 and makes slight modifications to the POROS nozzle/cavity structure.

Set 1: Electronics-Based Solutions

Current POROS operation uses predominantly the first cavity resonant mode at around 700 kHz resonance frequency. The existing electronics are capable of changing this frequency from 200 kHz to beyond 2 MHz, as well as signal amplitude with computer programming. Therefore:

a) A "chirp" (frequency sweep) excitation around 300-800 kHz range can be used to rapidly (within 1 ms) eject during the sweep while not allowing a clear standing aggregation pattern to develop. The amplitude at each frequency and frequency sweep time can be optimized. This is similar to mixing and ejection combined operation.

b) Similarly, and more simply, the frequency of operation can be switched between multiple modes moving the nodal points whereas, the amplitude is such that ejection happens in the desired mode and the other mode is used just to keep cells moving. Again, the input signal amplitudes can be optimized for this mode of operation.

In either case, the reduction in ejection rate can be balanced by introducing multiple ejection orifices in every nozzle.

Set 2: Acoustophoretic Force-Based Solutions

As mentioned above, if the acoustic field in the fluid domain can be adjusted such that both the acoustophoretic forces and the flow induced drag both move the cells to the nozzle tip, then there will not be a cell retention issue as long as all the cells can be ejected with a strong enough acoustic field. This can be achieved by introducing cells to the cavity only in a fluid filled region where they are located between the last pressure peak and the nozzle tip. An embodiment of an implementation is depicted in FIG. 6B, which shows the pressure distribution in current POROS, and current POROS geometry as well as the modified POROS, to prevent cell retention. In the modified POROS the bottom part of the POROS cavity will be filled with a biocompatible solid material that has the same or similar acoustic properties as the buffer solution so as not to disturb the acoustic field. PDMS is such as material and has been successfully used as a physical barrier in acoustophoresis by others (Ref. 7). Note that since the spatial pressure distribution along the vertical axis of the cavity is predominantly determined by wavelength, the pressure peak can be located below the nozzle plate so that the pressure distribution is similar for both configurations. In modified POROS all the cells introduced to the cavity only experience acoustophoretic forces propelling them to the nozzle (red arrows) in the same direction of the fluid drag (blue arrows).

The design changes in the POROS structure of the present embodiments comprise: i) the introduction of the PDMS layer to a level that the pressure peak closest to the nozzle tip is in PDMS, and/or ii) reduction of the thickness of the solid nozzle plate such that there is a larger vertical space for low lateral flow resistance between the nozzle plate and the PDMS surface.

If the flow resistance is high, the frequency of operation can be reduced to move the pressure peak and PDMS surface away from the nozzle tip. This may reduce the overall flow rate, but this can be overcome by introducing a larger number of nozzles/orifices in the nozzle plate. This will be a natural solution for a thinner silicon nozzle plate. Having shorter nozzles can reduce the acoustic focusing, but the amplitude of the piezoelectric transducer input can be increased to make up for the acoustic pressure drop. Even in the case that the peak pressure point is slightly above PDMS surface, since the cavity pressure node is now located in PDMS, the cells cannot aggregate at this node and the amount of cells propelled to the PDMS surface will be small, significantly reducing retention. Note that all these parameters can be optimized through 2D and 3D analysis, however, this solution is quite robust since it relies on manipulation of well-known acoustophoretic forces.

REFERENCES

The following references are incorporated by reference in their entirety as set forth herein.

1. Elrod, S. A., Hadimioglu, B., Khuri-Yakub, B. T., Rawson, E. G Richley, E., Quate, C. F., & Lundgren, T. S. (1989). Nozzleless droplet formation with focused acoustic beams. *Journal of Applied Physics,* 65(9), 3441-3447.
2. Perçin, G., Lundgren, T. S., & Khuri-Yakub, B. T. (1998). Controlled ink jet printing and deposition of organic polymers and solid particles. *Applied Physics Letters,* 73(16), 2375-2377.
3. Meacham, J. M., Ejimofor, C., Kumar, S., Degertekin, F. L. and Fedorov, A. G., 2004. Micromachined ultrasonic droplet generator based on a liquid horn structure. *Review of scientific instruments,* 75(5), pp. 1347-1352.
4. Meacham, J. M., Varady, M. J., Degertekin, F. L., & Fedorov, A. G. (2005). Droplet formation and ejection from a micromachined ultrasonic droplet generator: Visualization and scaling. *Physics of fluids,* 17(10), 100605.
5. Zarnitsyn, V. G., Meacham, J. M., Varady, M. J., Hao, C., Degertekin, F. L., & Fedorov, A. G. (2008). Electrosonic ejector microarray for drug and gene delivery. *Biomedical microdevices,* 10(2), 299-308,
6. A. D. Ledbetter, H. N. Shekhani, M. M. Binkley and J. M. Meacham, "Tuning the Coupled-Domain Response for Efficient Ultrasonic Droplet Generation," *IEEE Transactions on Ultrasonics, Ferroelectrics, and Frequency Control*, vol. 65, no. 10, pp. 1893-1904, October 2018.
7. Leibacher, Ivo, Sebastian Schatzer, and Jürg Dual. "Impedance matched channel walls in acoustofluidic systems." Lab on a Chip 14.3 (2014): 463-470.
8. McLean, J., & Degertekin, F. L. (2004). Directional scholte wave generation and detection using interdigital capacitive micromachined ultrasonic transducers. IEEE transactions on ultrasonics, ferroelectrics, and frequency control, 51(6), 756-764.

Unless defined otherwise, all technical and scientific terms used have the same meaning as commonly understood by one of ordinary skill in the art to which this disclosure belongs. Although any methods and materials similar or equivalent to those described can also be used in the practice or testing of the present disclosure, the preferred methods and materials are now described.

Embodiments of the present disclosure will employ, unless otherwise indicated, techniques of separating, testing, and constructing materials, which are within the skill of the art. Such techniques are explained fully in the literature.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A method of mitigating particle aggregation in an acoustic wave-driven fluid ejector, wherein the acoustic wave-driven fluid ejector includes: an acoustic actuator, a plurality of ejector structures formed by an ejector plate on a side of the acoustic wave-driven fluid ejector opposite the acoustic actuator, a biocompatible structure positioned in between the ejector structures and the acoustic actuator, and a sample reservoir formed by the ejector plate and a side of the biocompatible structure opposite the acoustic actuator; and further comprising: administering to a sample in need thereof, the sample in need thereof comprising particles, a standing acoustic field using an acoustic actuator within the sample reservoir, wherein the standing acoustic field comprises a frequency sweep excitation to eject particles during the sweep while not allowing a clear standing aggregation to develop using the acoustic wave-driven fluid ejector.

2. The method of claim 1, wherein the frequency sweep excitation has a range from about 200 kHz to about 2000 KHz.

3. The method of claim 1, wherein the frequency sweep excitation is delivered rapidly within 1 ms.

4. A method of mitigating particle aggregation in an acoustic wave-driven fluid ejector, wherein the acoustic wave-driven fluid ejector includes: an acoustic actuator, a plurality of ejector structures formed by an ejector plate on a side of the acoustic wave-driven fluid ejector opposite the acoustic actuator, a biocompatible structure positioned in between the ejector structures and the acoustic actuator, and a sample reservoir formed by the ejector plate and a side of the biocompatible structure opposite the acoustic actuator; and further comprising: administering to a sample in need thereof a standing acoustic field using an acoustic actuator within the sample reservoir, wherein the standing acoustic field has a frequency of operation capable of being switched between multiple modes of operation.

5. The method of claim 4, wherein the multiple modes of operation comprise a first mode and a second mode, and are capable of moving the nodal points whereas, the amplitude is such that ejection of particles happens as a result of the first mode and the second mode keeps particles in the sample in need thereof moving.

6. A method of mitigating particle aggregation in an acoustically driven fluid ejector wherein the acoustic wave-driven fluid ejector includes: an acoustic actuator, a plurality of ejector structures formed by an ejector plate on a side of the acoustic wave-driven fluid ejector opposite the acoustic actuator, each ejector having a nozzle, a biocompatible structure positioned in between the ejector structures and the acoustic actuator, and a sample reservoir formed by the ejector plate and a side of the biocompatible structure opposite the acoustic actuator; and further comprising:

adjusting the number of nozzles of the ejector of the acoustically driven fluid ejector in the range of from 0.5 to 50 nozzles per square millimeter to adjust a flow rate.

7. The method of claim 6, wherein the adjusting comprises adjusting the number orifices per nozzle in the 1 orifice/nozzle up to 14 orifices per nozzle so that the flow rate of fluid from the sample reservoir through the ejecting nozzles is high enough so that the flow drag forces overcome the acoustophoretic forces to prevent particle aggregation in a large section of the overall fluid volume containing a bulk or majority of a group of cells filling a reservoir of the ejector.

8. The method of claim 6, wherein a solid structure is not used inside an ejector cavity.

9. The method of claim 6, wherein a number of nozzles or orifices or orifices/nozzle per lateral area is increased such that the ejector is self-pumping, and the flow rate is high enough so that the flow drag forces overcome the acoustophoretic forces to prevent particle aggregation in a large section of the overall fluid volume in the ejector an acoustically transparent solid structure is used inside the ejector cavity so that cells are only in the fluid region that the flow drag forces are larger than the acoustophoretic forces causing particle aggregation.

10. The method of claim 6, wherein a the sample reservoir of the acoustically driven fluid ejector comprises the biocompatible material that has the same or similar acoustic properties to the buffer solution.

11. The method of claim 6, wherein the acoustically driven fluid ejector comprises the biocompatible material that has the same or similar acoustic properties to a buffer solution and where the material impedes the aggregation of particles in certain locations.

12. The method of claim 11, wherein the biocompatible material has a surface distanced from the nozzle tip closer than a first pressure node from a nozzle tip.

13. The method of claim 11, where the biocompatible material has a surface distanced from the nozzle tip closer than a first pressure peak from a nozzle tip.

14. A method of mitigating particle aggregation in an acoustic wave-driven fluid ejector, comprising:

administering to a sample in need thereof, the sample in need thereof comprising particles, a standing acoustic field comprising a frequency sweep excitation to eject particles during the sweep while not allowing a clear standing aggregation to develop wherein the acoustically driven fluid ejector further comprises one or more electrodes within a reservoir of a acoustically driven fluid ejector and in the vicinity of an ejector orifice or in a nozzle, the electrodes configured to provide an electric field to a sample in the reservoir.

* * * * *